US009609308B2

(12) United States Patent
Suzuki et al.

(10) Patent No.: US 9,609,308 B2
(45) Date of Patent: Mar. 28, 2017

(54) IMAGE PROCESSING DEVICE, METHOD OF CONTROLLING IMAGE PROCESSING DEVICE AND PROGRAM CAUSING COMPUTER TO EXECUTE METHOD

(75) Inventors: Naho Suzuki, Tokyo (JP); Hideki Nabesako, Tokyo (JP); Takami Mizukura, Kanagawa (JP)

(73) Assignee: SONY CORPORATION, Tokyo (JP)

(*) Notice: Subject to any disclaimer, the term of this patent is extended or adjusted under 35 U.S.C. 154(b) by 533 days.

(21) Appl. No.: 13/549,954

(22) Filed: Jul. 16, 2012

(65) Prior Publication Data
US 2013/0050429 A1 Feb. 28, 2013

(30) Foreign Application Priority Data
Aug. 24, 2011 (JP) ................................. 2011-182518

(51) Int. Cl.
H04N 13/02 (2006.01)
G06T 5/00 (2006.01)

(52) U.S. Cl.
CPC ......... H04N 13/0271 (2013.01); G06T 5/002 (2013.01); G06T 5/008 (2013.01); *G06T 2207/10004* (2013.01); *G06T 2207/10028* (2013.01)

(58) Field of Classification Search
CPC .............................. H04N 13/0271; G06T 5/00
See application file for complete search history.

(56) References Cited

U.S. PATENT DOCUMENTS

| 8,131,098 | B2* | 3/2012 | Watanabe | G06K 9/4633 |
| | | | | 345/422 |
| 2002/0039424 | A1* | 4/2002 | Watanuki | G11C 7/16 |
| | | | | 381/74 |
| 2004/0056966 | A1* | 3/2004 | Schechner | G06T 7/0018 |
| | | | | 348/229.1 |
| 2009/0022396 | A1* | 1/2009 | Watanabe | G06K 9/4633 |
| | | | | 382/167 |
| 2011/0025834 | A1* | 2/2011 | Chen | H04N 7/18 |
| | | | | 348/77 |
| 2012/0039525 | A1* | 2/2012 | Tian | G06T 5/005 |
| | | | | 382/154 |
| 2012/0127360 | A1* | 5/2012 | Devaux | G03B 13/36 |
| | | | | 348/349 |
| 2013/0258053 | A1* | 10/2013 | Maruyama | H04N 13/0003 |
| | | | | 348/43 |

FOREIGN PATENT DOCUMENTS

| CN | 1451230 A | 10/2003 |
| JP | 2003-37767 | 2/2003 |

OTHER PUBLICATIONS

U.S. Appl. No. 13/542,189, filed Jul. 5, 2012, Matsui et al.
Chinese Office Action issued Aug. 8, 2016 in Chinese Patent Application No. 201210294871.X with translation.

* cited by examiner

*Primary Examiner* — Brian Yenke
*Assistant Examiner* — Sean Haiem
(74) *Attorney, Agent, or Firm* — Oblon, McClelland, Maier & Neustadt, L.L.P.

(57) ABSTRACT

There is provided an image processing device including an image acquisition part acquiring an image; a depth acquisition part acquiring a depth associated with a pixel in the image; a depth conversion part converting the depth in accordance with a function having a characteristic to non-linearly approach a predetermined value with an increase in the depth; and a storage part storing the converted depth in association with the image.

22 Claims, 23 Drawing Sheets

FIG. 6

| DEPTH OF FIELD DOF [m] (BLURRING AMOUNT) | SHALLOW (LARGE) | DEEP (SMALL) |
|---|---|---|
| FOCAL POINT DISTANCE f [m] | LONG (TELEPHOTO) | SHORT (WIDE-ANGLE) |
| APERTURE VALUE N (F-NUMBER) | LARGE | SMALL |
| SUBJECT DISTANCE x [m] | NEAR | DISTANT |
| COEFFICIENT $\beta$ | LARGE | SMALL |

IMAGE PROCESSING DEVICE, METHOD OF CONTROLLING IMAGE PROCESSING DEVICE AND PROGRAM CAUSING COMPUTER TO EXECUTE METHOD

BACKGROUND

The present technology relates to an image processing device, a method of controlling an image processing device and a program causing a computer to execute the method, and particularly to an image processing device, a method of controlling an image processing device and a program causing a computer to execute the method performing image processing based on a depth.

In recent years, an image pickup apparatus capable of measuring a depth in association with a pixel in an image becomes popular. An image processing device in an image pickup apparatus can perform image processing such as blur processing (i.e., smoothing processing) for producing bokeh by using the depth.

For example, an image pickup apparatus that measures depths to subjects and performs, with focusing on a principal subject, smoothing processing on a background of the principal subject to a degree corresponding to a depth based on the principal subject is disclosed (e.g., Japanese Patent Laid-Open No. 2003-37767). Such smoothing processing is often performed on a background of a portrait photo, for example, for highlighting the person. Further, because an image pickup apparatus equipped with an image sensor with a small light receiving surface area captures an image with relatively small bokeh due to a property of the image sensor, the smoothing processing is often used for emphasizing a perspective.

SUMMARY

In the above technique in the past, it was difficult to emphasize the perspective to a higher degree by the smoothing processing. The above-described image pickup apparatus linearly varies a degree of the smoothing processing with respect to a distance from a focusing position. However, the perspective is more greatly emphasized when the degree of the smoothing processing is varied non-linearly with respect to the distance from the focusing position. Suppose the degree (that is, blurring amount) of the smoothing processing is set on a distance S1 from the focusing position and a distance S2 twice as long as the distance S1, for example. In this case, when the blurring amount B1 of a subject in S1 is set larger than half the blurring amount B2 of a subject in S2, the perspective is more emphasized. Though such emphasis of the perspective can be performed by a user manually, complicated operations are necessary for the emphasis.

In view of the above problem, it is desirable to provide an image processing device that emphasizes perspective of an image by performing image processing.

According to embodiments of the present disclosure, there is provided an image processing device which includes an image acquisition part acquiring an image, a depth acquisition part acquiring a depth associated with a pixel in the image, a depth conversion part converting the depth in accordance with a function having a characteristic to nonlinearly approach a predetermined value with an increase in the depth, and a storage part storing the converted depth in association with the image, and there are provided a method of controlling the image processing device and a program for causing a computer to execute the method. Accordingly, the depth converted in accordance with the function having the characteristic to nonlinearly approach the predetermined value with an increase in the depth is stored in association with the image.

According to embodiments of the present disclosure, there may be further included a smoothing processing part performing smoothing processing on the image to a degree depending on the converted depth corresponding to the pixel in the image based on a converted depth corresponding to a predetermined pixel in the image. Accordingly, the smoothing processing depending on the converted depth is performed on the image.

According to embodiments of the present disclosure, the function is the function with a characteristic that varies depending on a coefficient, and the smoothing processing part may perform the smoothing processing based on the depth converted in accordance with the characteristic. Accordingly, the smoothing processing based on the depth converted in accordance with the characteristic depending on the coefficient is performed.

Further, according to embodiments of the present disclosure, the function may be an exponential function letting the depth be x, an output be y, a base of natural logarithm be e, a predetermined constant be a and the coefficient be β, and defined as the following formula $y=\alpha \times e^{(-\beta x)}$. Accordingly, the depth is converted in accordance with the function defined by the above-described formula.

Still further, according to embodiments of the present disclosure, the function may be an exponential function letting the depth be x, an output be y, a base of natural logarithm be e, a predetermined constant be a and the coefficient be β, and defined by the following formula $y=\alpha \times \{1-e^{(-\beta x)}\}$. Accordingly, the depth is converted in accordance with the function defined by the above-described formula.

Still further, according to embodiments of the present disclosure, there may be further included a coefficient supply part supplying a value of the coefficient depending on a shooting condition under which the image is captured. Accordingly, the coefficient depending on the shooting condition is supplied.

Still further, according to embodiments of the present disclosure, the storage part may further store the shooting condition in association with the image, and the coefficient supply part may supply the coefficient depending on the stored shooting condition. Accordingly, the coefficient depending on the stored shooting condition is supplied.

Still further, according to embodiments of the present disclosure, the depth conversion part may create an aggregation of the pixels as a depth image, each pixel having the converted depth value as a pixel value. Accordingly, the aggregation of the pixels is created as the depth image in which each pixel has the converted depth value as the pixel value.

Still further, according to embodiments of the present disclosure, there may be further included a compression part compressing the depth image in accordance with a predetermined image compression format, and the storage part may store the compressed depth image in association with the image. Accordingly, the depth image is compressed.

According to an embodiment of the present technology, the image processing device is advantageous to emphasize a perspective in an image by image processing.

BRIEF DESCRIPTION OF THE DRAWINGS

FIG. 6 is a diagram illustrating an example of a relationship of the depth of field with the focal point distance, an aperture value, the subject distance and a coefficient β according to the first embodiment;

DETAILED DESCRIPTION OF THE EMBODIMENT(S)

Figure 1:
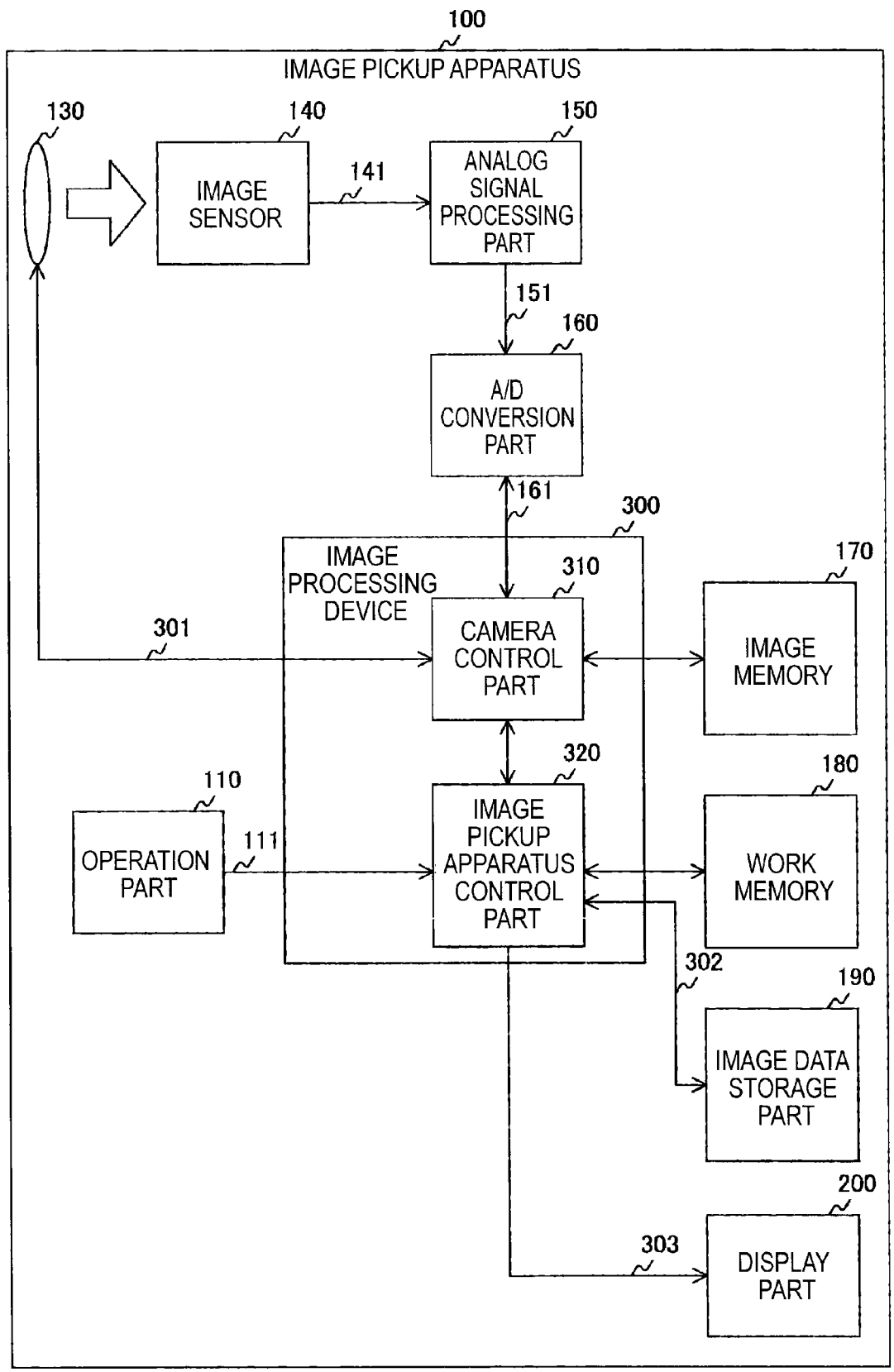
FIG. 1 is a block diagram illustrating a configuration example of an image pickup apparatus according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The preferred embodiments (hereinafter referred to as embodiments) according to the present technology will be described below in the following order.

1. First Embodiment (Image Processing: Example of Converting Depth Data to Depth Image Data)
2. Second Embodiment (Image Processing: Example of Changing Coefficient Value Based on Shooting Mode)
3. Third Embodiment (Image Processing: Example of Changing Coefficient Value after Storing Image Data)

1. First Embodiment

Image Pickup Apparatus Configuration Example

FIG. 1 is a block diagram illustrating a configuration example of an image pickup apparatus 100 according to a first embodiment. The image pickup apparatus 100 includes an operation part 110, a shooting lens 130, an image sensor 140, an analog signal processing part 150, an A/D (Analog/Digital) conversion part 160, an image memory 170 and a work memory 180. Further, the image pickup apparatus 100 includes an image data storage part 190, a display part 200 and an image processing device 300. The image processing device 300 includes a camera control part 310 and an image pickup apparatus control part 320.

The operation part 110 outputs an operation signal in response to a user operation on a touch panel, a button or the like to the image processing device 300 via a signal line 111. The operation will be described below in detail.

The shooting lens 130 is the lens for shooting an image. The image sensor 140 converts light from the shooting lens 130 to an electrical signal. The image sensor 140 outputs the converted electrical signal to the analog signal processing part 150 via a signal line 141. The analog signal processing part 150 performs predetermined analog signal processing on the electrical signal. The analog signal processing includes CDS (Correlated Double Sampling) that cancels an amplifier noise and a reset noise and AGC (automatic Gain Control) that automatically controls a gain. The analog signal processing part 150 outputs the electrical signal after performing the processing to the A/D conversion part 160 via a signal line 151.

The A/D conversion part 160 converts an analog electrical signal to a digital signal. The A/D conversion part 160 outputs the converted digital signal to the image processing device 300 via a signal line 161 as image data. Such image data is referred to as RAW image data because image processing such as demosaic processing or compression processing is not performed on the image data at a time point when the image data is output from the A/D conversion part 160.

The image memory 170 temporarily holds the image data. The work memory 180 temporarily holds the contents of work performed by the image pickup apparatus control part 320. The image data storage part 190 stores the image data. The display part 200 displays an image based on the image data.

The camera control part 310 performs zoom control and exposure control in accordance with control by the image pickup apparatus control part 320 to acquire image data from the A/D conversion part 160. The camera control part 310 acquires a depth related to a pixel in the image data from the acquired image data. The camera control part 310 converts the depth in accordance with a predetermined function. The conversion method will be described below in detail. The camera control part 310 generates an image obtained by aggregation of pixels each having the converted depth as a gradation value. The generated image is an image (hereinafter, referred to as "depth image") in which a depth of a subject in the image is represented by the gradation values of the pixels in a region of the subject. The camera control part 310 outputs data of the depth image as depth image data to the image pickup apparatus control part 320 together with the image data.

The image pickup apparatus control part 320 controls the whole of the image pickup apparatus 100. In particular, the image pickup apparatus control part 320 performs zoom control and exposure control via the camera control part 310 in response to the operation signal from the operation part 110. The image pickup apparatus control part 320 receives the image data and the depth image data from the camera control part 310 and stores the depth image data in the image data storage part 190 in association with the image data. Further, the image pickup apparatus control part 320 reads out the image data from the image data storage part 190 via a signal line 302 in response to the operation signal from the operation part 110. The image pickup apparatus control part 320 performs image processing such as smoothing processing on the image data based on the corresponding depth image data. The image processing will be described below in detail. As well as storing the image data after the image processing in the image data storage part 190, the image pickup apparatus control part 320 outputs the image data to the display part 200 via a signal line 303 to cause the display part 200 to display the image data.

[Image Processing Device Configuration Example]

Figure 2:
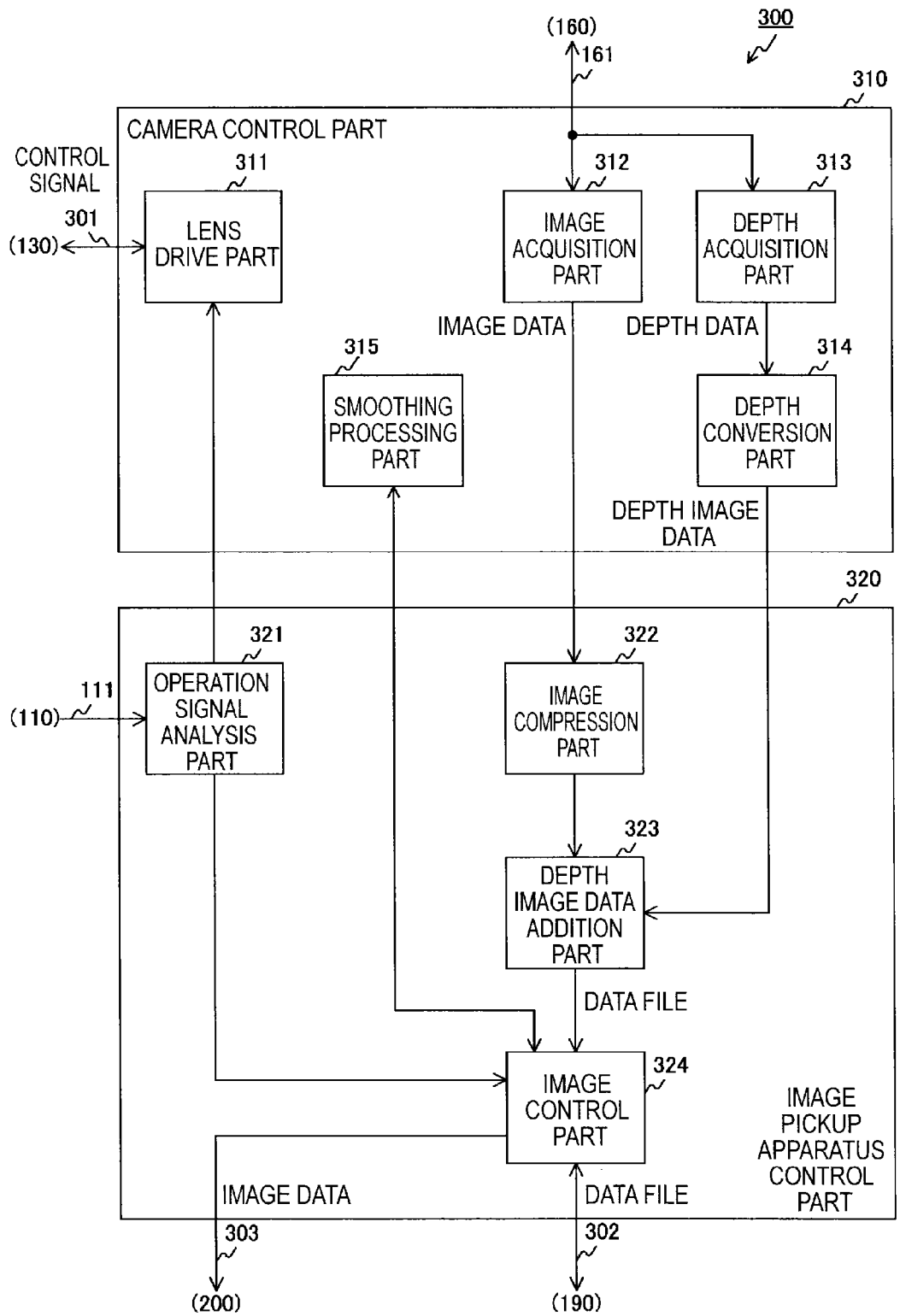
FIG. 2 is a block diagram illustrating a configuration example of an image processing device according to the first embodiment.

FIG. 2 is a block diagram illustrating a configuration example of the image processing device 300 according to the first embodiment. As described above, the image processing device 300 includes the camera control part 310 and the image pickup apparatus control part 320. The camera control part 310 includes a lens drive part 311, an image acquisition part 312, a depth acquisition part 313, a depth conversion part 314 and a smoothing processing part 315. The image pickup apparatus control part 320 includes an operation signal analysis part 321, an image compression part 322, a depth image data addition part 323 and an image control part 324.

The operation signal analysis part 321 analyzes the operation signal from the operation part 110. Here, a user can change a zoom magnifying power, a degree of emphasis of the perspective in the smoothing processing and the like by operating the operation part 110. The operation signal analysis part 321 analyzes the operation signal, and when the zoom magnification power is changed, outputs the changed value of the zoom magnification power to the lens drive part 311. Further, when the degree of emphasis of the perspective is changed, the operation signal analysis part 321 outputs the changed degree of emphasis to the image control part 324.

The lens drive part 311 controls a position of the shooting lens 130. In particular, the lens drive part 311 acquires a current position of the shooting lens 130 via a signal line 301 when receiving the changed value of the zoom magnification power from the operation signal analysis part 321. Subsequently, the lens drive part 311 outputs a control signal to control, based on the changed value of the zoom magnification power, the position of the shooting lens 130 to the shooting lens 130 via the signal line 301.

The image acquisition part 312 acquires captured image data. The acquired image data is temporarily held by the image memory 170. The image acquisition part 312 outputs the acquired image data to the image compression part 322.

The depth acquisition part 313 acquires a depth corresponding to a pixel in the captured image data. For example, the depth acquisition part 313 detects a gap (phase difference) between two images of a subject separated by a separator lens and calculates a distance to the subject as a depth based on the detected phase difference. The depth acquisition part 313 outputs the depth calculated in association with the pixel as depth data to the depth conversion part 314. Note that, the depth acquisition part 313 may acquire the depth by a method other than the phase difference detection. For example, the depth acquisition part 313 may irradiate laser beams on the subject and detects the reflected light of the laser beams to measure a depth based on a delay time of the detection time from the irradiation time.

The depth conversion part 314 converts the depth in accordance with a predetermined function. Such function is defined by the following formula 1 and formula 2, for example. Note that, in formula 1, x represents a depth, y represents an output (i.e., converted depth) of the function, e represents base of natural logarithm and β represents a coefficient of a real number larger than 0. In the following formula 2, n represents an integer (e.g., "16") not less than 1.

$$Y = \alpha e^{\wedge}(-\beta x) \qquad \text{Formula 1}$$

$$\alpha = 2^{\wedge} n - 1 \qquad \text{Formula 2}$$

Note that, the depth conversion part 314 may convert the depth by using a function other than the function defined by formula 1. It is preferable that the function to be used has such a character that the output y non-linearly approaches a predetermined value (e.g., 0) in response to increase in the depth x. For example, the depth conversion part 314 may use a logarithm function defined by a formula modified from formula 1 or a function defined by formula 12 described below.

The depth conversion part 314 sets a predetermined initial value to the coefficient β and converts the depth x to y to create image data obtained by aggregation of pixels each having y as a gradation value. The depth conversion part 314 outputs the created image data to the depth image data addition part 323 as the depth image data. Note that, the depth conversion part 314 may convert y to a pixel value further including a color phase (red, green, blue or the like) in addition to the gradation value. For example, the depth conversion part 314 may change the gradation value with respect to each color depending on y such that the smaller a value of y is, the closer to red the gradation value is, and the larger the value of y is, the closer to blue the gradation value is.

The image compression part 322 compresses the image data as necessary in accordance with a predetermined image compression scheme. The image compression part 322 uses the work memory 180 as a work area during the image compression processing. For example, JPEG (Joint Photographic Experts Group) is used as the image compression scheme. The image compression part 322 outputs the compressed image data to the depth image data addition part 323.

Note that, the image compression part 322 may output the image data uncompressed to the depth image data addition part 323. Alternatively, the image compression part 322 may further compress the depth image data. In this case, it is desirable that the compression technology used for the depth image data is the same as the compression technology used for the image data.

The depth image data addition part 323 stores the image data output from the image compression part 322 in association with the depth image data output from the depth conversion part 314. The depth image data addition part 323 associates the depth image data with the image data by adding the depth image data to the image data as attached information (i.e., tag) in Exif (Exchangeable image file format), for example. The depth image data addition part 323 outputs the image data with the associated depth image data to the image control part 324 as a data file. Note that, the depth image data addition part 323 is an example of a storage part according to embodiments of the present disclosure.

The image control part 324 manages the image data. In particular, the image control part 324 stores the data file created by the depth image data addition part 323 in the image data storage part 190. Further, the image control part 324 reads out a data file including the image data to be displayed from the image data storage part 190 and outputs the read out image data to the display part 200 to cause the display part 200 to display the image data. Still further, the image control part 324 reads out, when a setting value of the emphasizing degree of the perspective is set by the operation signal analysis part 321, a data file including image data of a smoothing processing target from the image data storage part 190 and outputs the data file to the smoothing processing part 315 together with the setting value. Subsequently, the image control part 324 receives smoothed image data from the smoothing processing part 315 and outputs the smoothed image data to the image data storage part 190 and the display part 200.

The smoothing processing part 315 performs smoothing processing on image data. In particular, when receiving the data file and the setting value from the image control part 324, the smoothing processing part 315 performs smoothing processing on the image data in the data file based on the depth image data. However, the emphasizing degree of the perspective may be changed by a user through the operation part 110 as described above. The smoothing processing part 315 updates, when the emphasizing degree of the perspective is changed, a value of the coefficient β in formula 1 depending on the change. In particular, in the case where the user changes the emphasizing degree of the perspective to be stronger, the value of the coefficient β is updated to be larger, and in the case where the user changes the emphasizing degree of the perspective to be weaker, the value of the coefficient β is updated to be smaller. Then, the smoothing processing part 315 performs smoothing processing after updating the depth image data based on the updated coefficient β. In the smoothing processing, the smoothing processing part 315 performs smoothing processing on the image data, based on a gradation value of a pixel determined as a focal point in the depth image data, with a degree corresponding to a difference between the gradation value of the pixel determined as the focal point and a gradation value of each pixel. The smoothing processing part 315 outputs the smoothed image data to the image control part 324.

Figure 3:
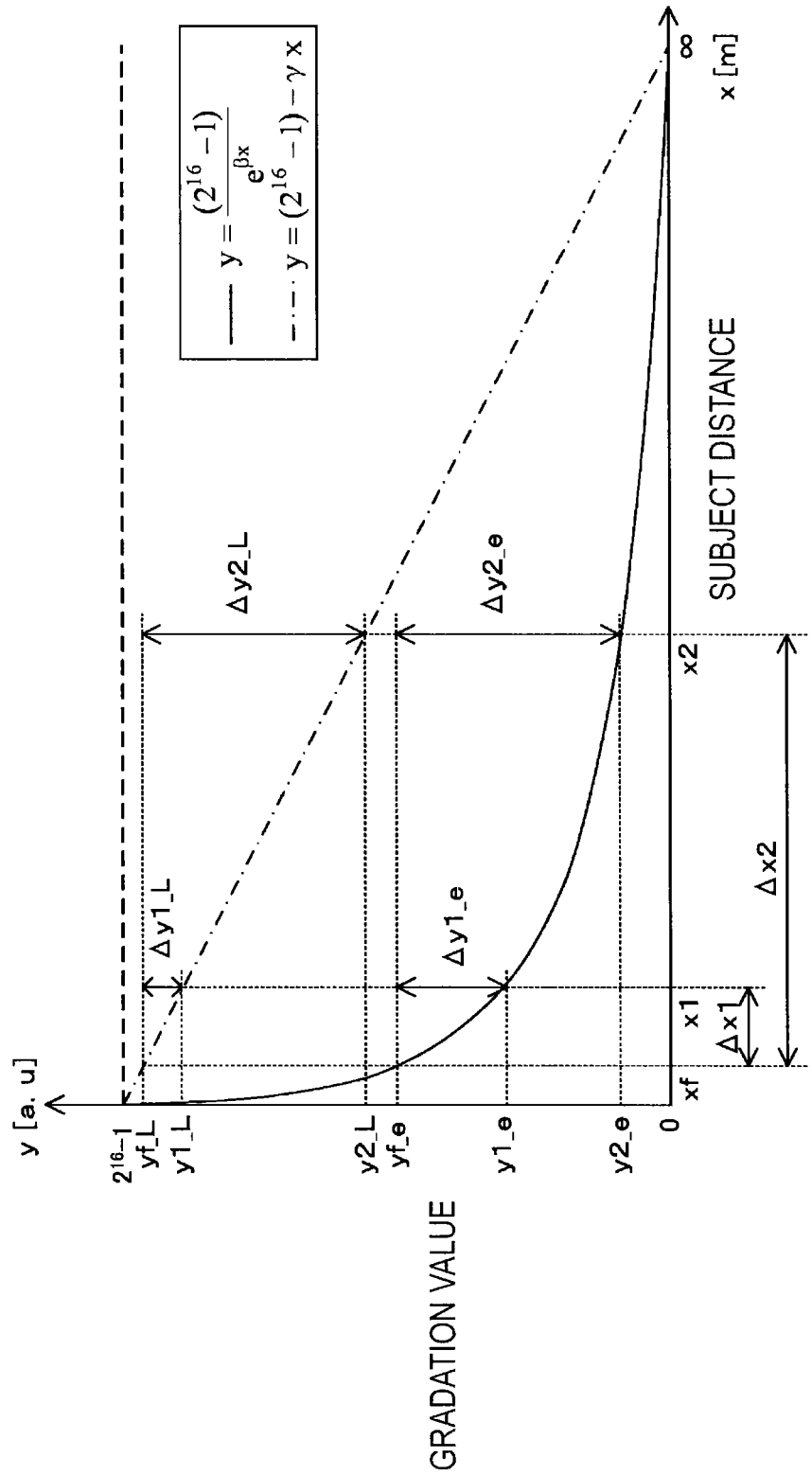
FIG. 3 is a graph illustrating an example of a relationship between a gradation value and a subject distance according to the first embodiment.

FIG. 3 is a graph illustrating an example of a relationship between the gradation value and the subject distance according to the first embodiment. In the figure, a horizontal axis represents the subject distance, that is, the depth, and a vertical axis represents the gradation value. A unit of the depth is measured in meter (m), for example. A solid line represents a graph of a function defined by formula 1, and a dashed line represents a graph of a function defined by formula 3. Note that, in the following formula 3, x represents a depth, y represents an output of the function and a γ represents a coefficient of a real number larger than 0.

$$Y = (2^{16} - 1) - \gamma x \qquad \text{Formula 3}$$

In formula 3, the depth is converted to a gradation value linearly decreasing in response to increase in depth.

Here, let a depth of a focused position in the smoothing processing be xf. And, let a depth deeper than xf be x1, and a depth further deeper than x1 be x2. Let the gradation value y obtained by substituting the depths xf, x1 and x2 in formula 1 be yf_e, y1_e and y2_e, respectively. Let the gradation value y obtained by substituting the depths xf, x1 and x2 in formula 3 be yf_L, y1_L and y2_L, respectively. And, let a difference between xf and x1 be Δx1 and a difference between xf and x2 be Δx2. Further, let a difference between yf_e and y1_e be Δy1_e and a difference between yf_e and y2_e be Δy2_e. Still further, let a difference between yf_L and y1_L be Δy1_L and a difference between yf_L and y2_L be Δy2_L.

In the smoothing processing, the smoothing processing is performed, depending on a gradation value corresponding to a depth x_f of the focused position, to a degree depending on a gradation value corresponding to each pixel in the image. For example, a blurring amount B representing a smoothing degree is calculated by the following formula 4. Note that, in the following formula 4, A represents a coefficient of a real number and Δy represents a difference between a gradation value of the focused position and a gradation value of a position on which smoothing is to be performed. In particular, Δy1_e, Δy2_e, Δy1_L, Δy2_L or the like is substituted into Δy.

$$B = A \times \Delta y \qquad \text{Formula 4}$$

The smoothing processing is performed by using a Gaussian filter defined by the following formula 5 through formula 7, for example. However, I (xp+k, yp+1) in the following formula 5 represents a pixel value of a pixel on a coordinate (xp+k, yp+1) before performance of smoothing processing. In formula 5, r represents a radius of the Gaussian filter and an integer not less than 0 and w (k, l) represents a weight coefficient by which the pixel value I (xp+k, yp+1) is to be multiplied. Further in formula 6, σ represents a standard deviation and a predetermined real number is set. By the following formula 5 and formula 6, the weight coefficient is set to be larger at a position closer to the center of the Gaussian filter, and set to be smaller at a position closer to a surrounding area. In the following formula 7, "round( )" is a function returning an integer value not less than 0 by performing predetermined rounding on a value shown in parentheses. For example, rounding half up or rounding off is performed as the rounding. Note that, the smoothing processing part 315 may perform the smoothing processing by using a filter (e.g., mean filter) other than the Gaussian filter.

$$I'(x_p, y_p) = \sum_{k=-r}^{r} \sum_{l=r}^{r} w(k, l) I(x_p + k, y_p + 1) \qquad \text{Formula 5}$$

$$w(x_p, y_p) = \frac{1}{2\pi\sigma^2} \exp\left\{\frac{-(x_p^2 + y_p^2)}{2\sigma^2}\right\} \qquad \text{Formula 6}$$

$$R = \text{round}(B/2) \qquad \text{Formula 7}$$

When formula 3 is used, smoothing processing is performed to a degree in proportion to difference in depth. For example, a ratio of $\Delta y2\_L$ to $\Delta y1\_L$ is equal to a ratio of $\Delta x2$ to $\Delta x1$. Accordingly, a ratio of a blurring amount $B2\_L$ of a subject in x2 to a blurring amount $B1\_L$ of a subject in x1 is equal to the ratio of $\Delta x2$ to $\Delta x1$.

On the other hand, when formula 1 is used, a blurring amount nonlinearly related to the difference in depth is set. For example, a ratio of $\Delta y2\_L$ to $\Delta y1\_L$ is larger than a ratio of $\Delta x2$ to $\Delta x1$. Accordingly, a ratio of a blurring amount $B2\_e$ of a subject in x2 to a blurring amount $B1\_e$ of a subject in x1 is larger than the ratio of $\Delta x2$ to $\Delta x1$. As a result, perspective is emphasized to a higher degree in comparison with the case where formula 3 is used. When a value of the coefficient $\beta$ in formula 1 is changed, a characteristic of formula 1 varies thereby to easily change the emphasis degree of the perspective. In particular, the larger the coefficient $\beta$ is, the higher the emphasis degree of the perspective is, and the smaller the coefficient $\beta$ is, the lower the emphasis degree of the perspective is.

Figure 4A:
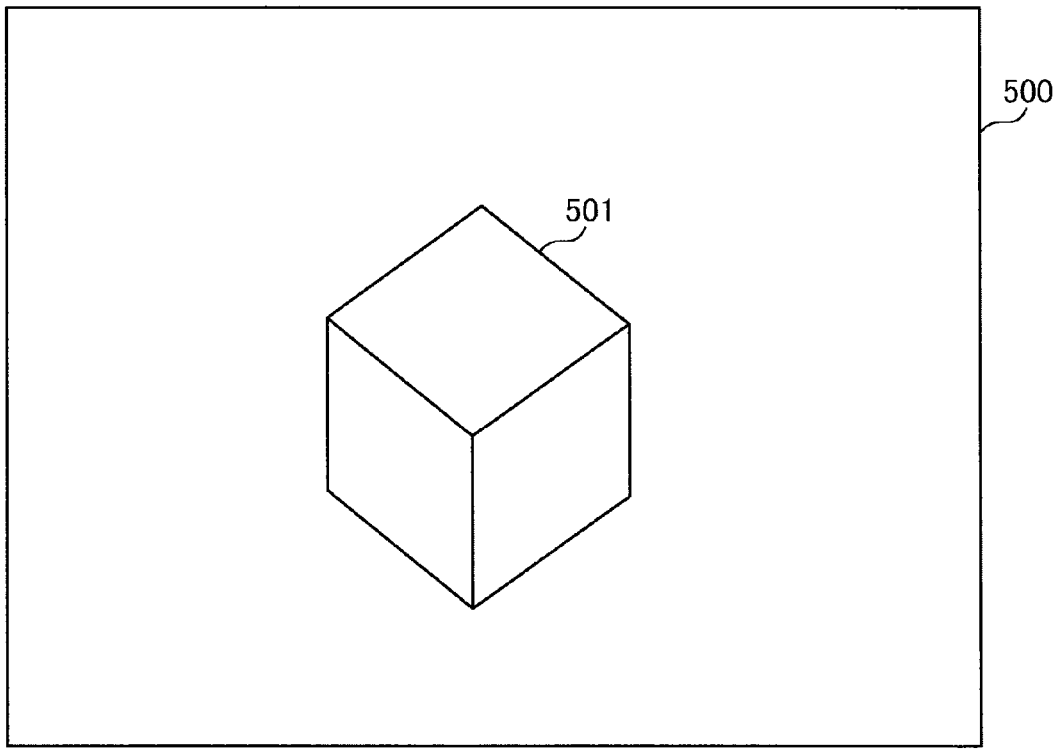
FIGS. 4A, 4B are diagrams illustrating examples of image data and depth image data according to the first embodiment.
Figure 4B:
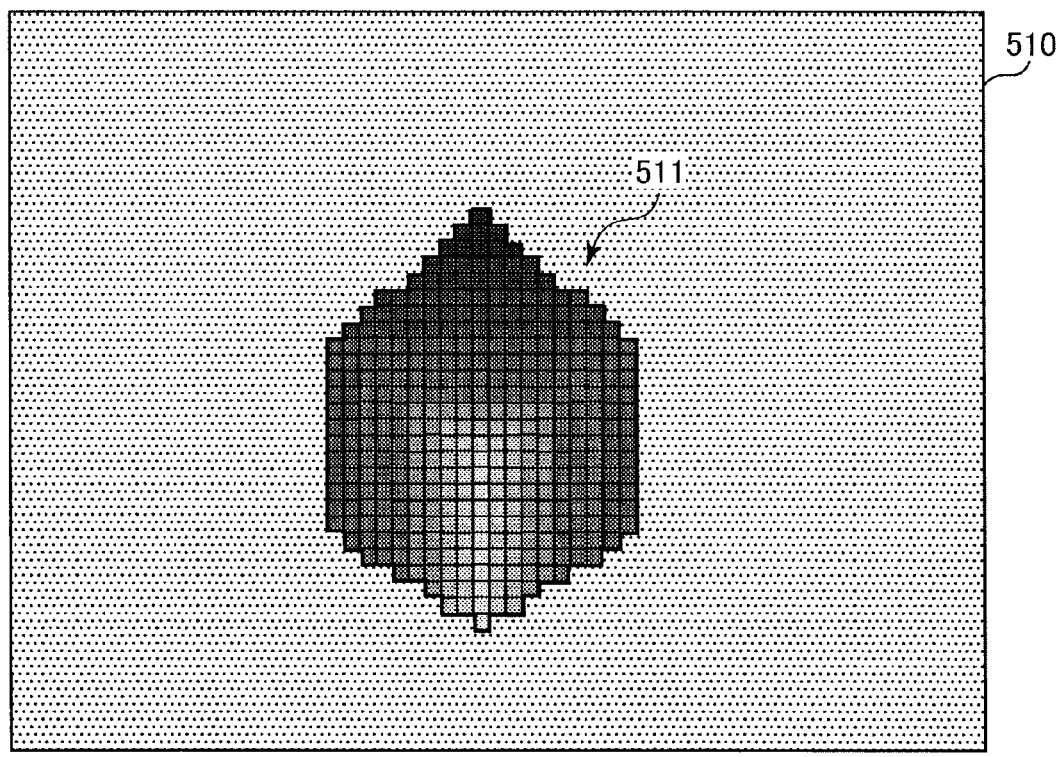

FIGS. 4A and 4B are diagrams illustrating examples of the image data and the depth image data according to the first embodiment. FIG. 4A illustrates an example of the image data 500. FIG. 4B illustrates an example of the depth image data 510 created by using formula 1. The image data 500 shows a cube 501. The depth image data 510 is set at gradation values corresponding to acquired depths. For example, because a depth of a vertex of a cube 511 corresponding to the cube 501 is smallest, a gradation value at the portion of the vertex is set at the largest value to become bright. On the other hand, a gradation value of a background having the largest depth is set at the smallest vale to become dark.

Figure 5:
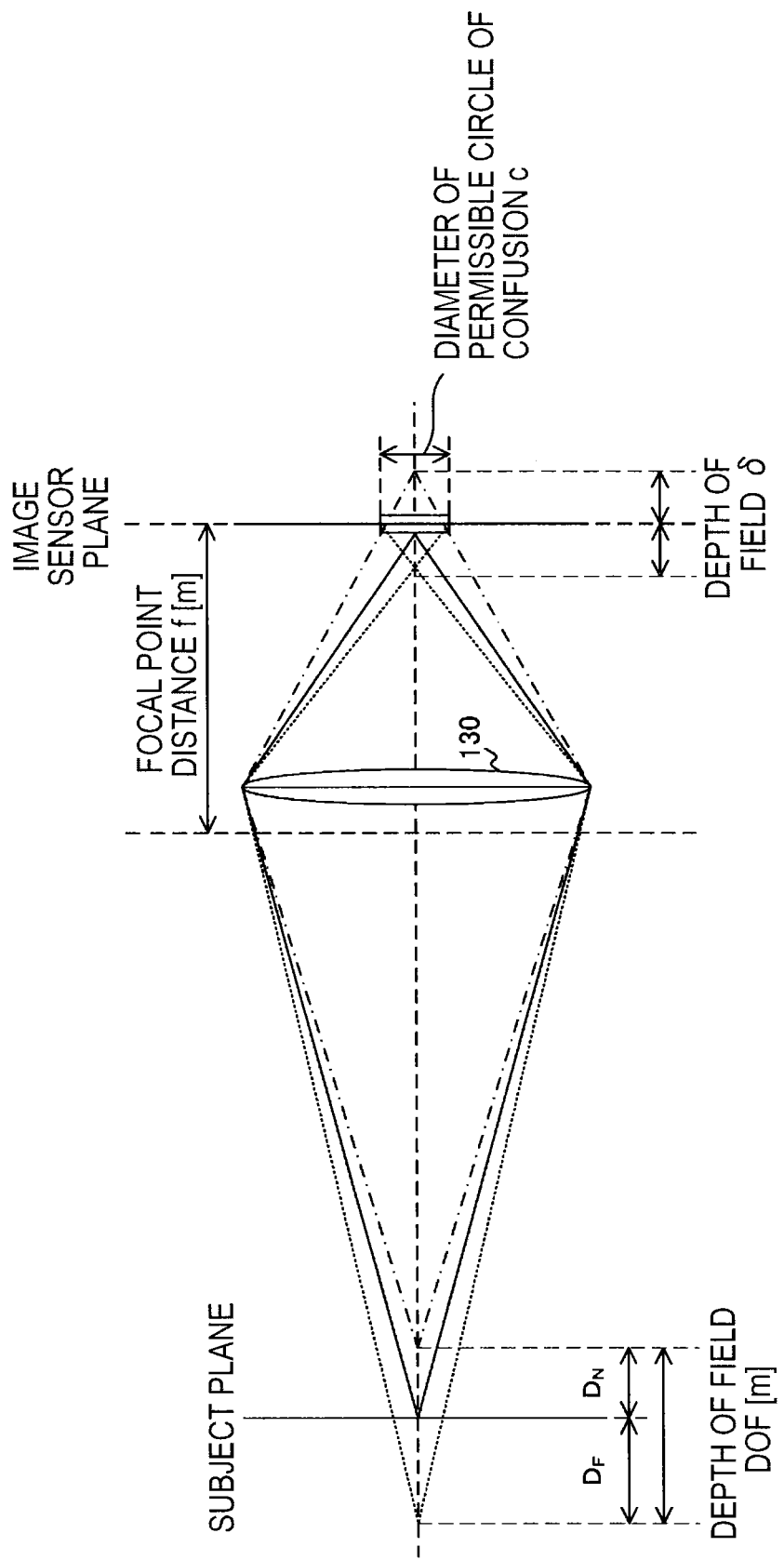
FIG. 5 is a diagram explanatory of a relationship between a focal point distance and the depth of field according to the first embodiment.

FIG. 5 is a diagram explanatory of a relationship between a focal point distance f and the depth of field DOF according to the first embodiment. The focal point distance f is a distance from the center of the shooting lens 130 to the focal point. The depth of field DOF is a range keeping a subject to be focused in an image even in the case where the subject is moved along a depth direction. The focal point distance f and the depth of field DOF are measured in meters (m), for example. The shallower the depth of field DOF is, the larger the blurring amount becomes in a defocused region. The depth of field DOF of a range on the near side of the subject is referred to as a near depth of field DN. On the other hand, the depth of field DOF of a range on the far side of the subject is referred to as a far depth of field DF.

Here, when a subject in a certain depth is focused, a depth with infinity barely passing the farthest borderline of the depth of field DOF is referred to as a hyper focal point distance H. The hyper focal point distance H is represented as the following formula 8. Note that, in formula 8, N represents an aperture value, c represents a diameter of a permissive circle of confusion in which blur in image is permissive.

$$H = f^2/(Nc) \quad \text{Formula 8}$$

The depth of field DOF is calculated by the following formula 9 through formula 11.

$$D_N = \frac{s(H-f)}{H+s-2f} \quad \text{Formula 9}$$

$$D_F = \frac{s(H-f)}{H-s} \quad \text{Formula 10}$$

$$DOF = D_F + D_N \quad \text{Formula 11}$$

FIG. 6 is a diagram illustrating an example of a relationship of the depth of field DOF with the focal point distance f, the aperture value N, the subject distance f and the coefficient $\beta$ according to the first embodiment. According to formula 8 through formula 11, the longer the focal point distance f is, and the larger the aperture value N is, the shallower the depth of field DOF becomes, and the larger the blurring amount becomes. And the nearer the subject distance x is, the smaller the hyper focal point distance H becomes and the shallower the depth of field DOF becomes according to formula 8 through formula 11. On the other hand, the larger the coefficient $\beta$ is, the larger the blurring amount becomes according to formula 1. As described above, by changing the value of the coefficient $\beta$, the blurring amount can be changed without changing the focal point distance f, the aperture value N and the subject distance x.

Figure 7:
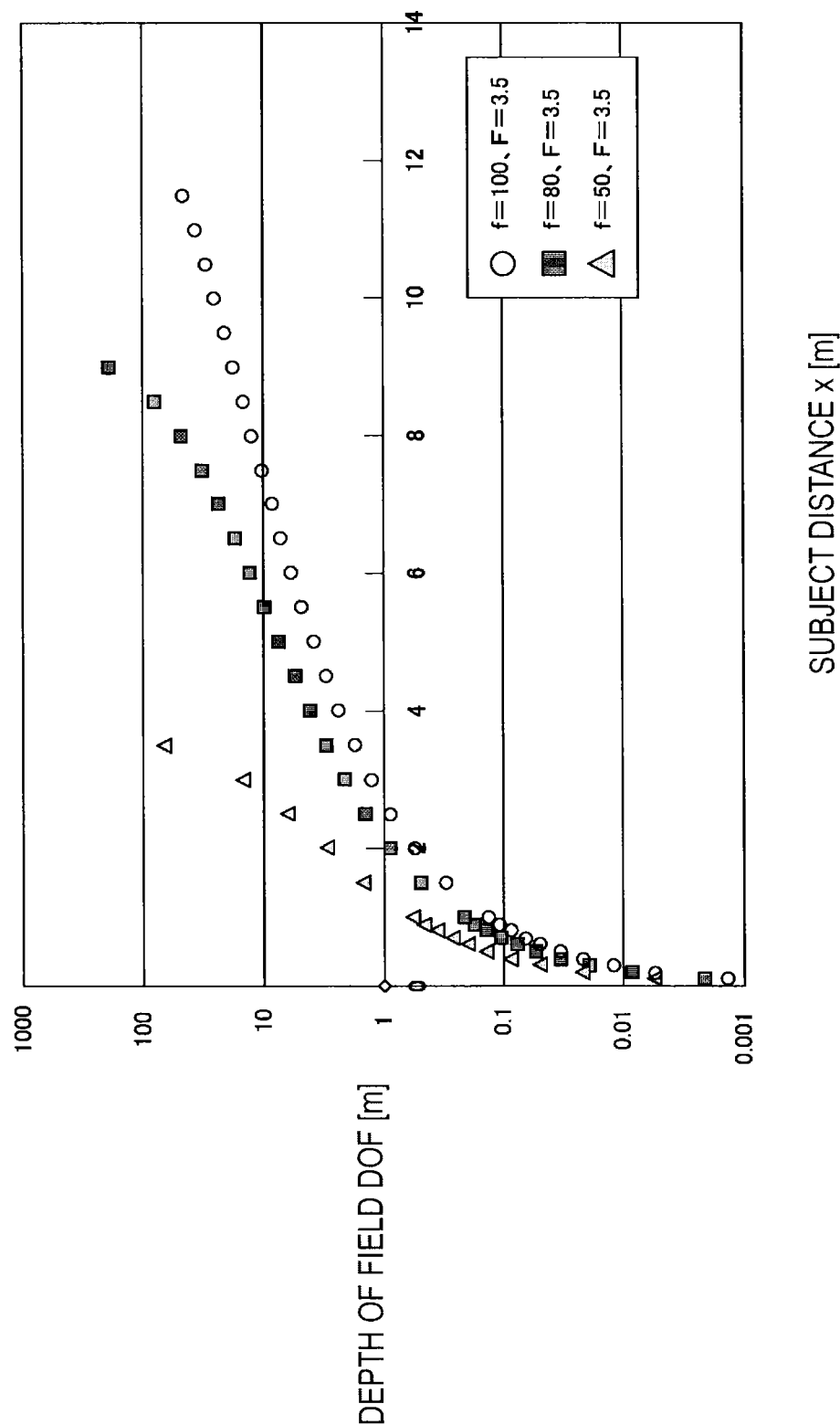
FIG. 7 is a diagram illustrating an example of a relationship of the depth of field with the focal point distance and the subject distance according to the first embodiment.

FIG. 7 is a graph illustrating an example of a relationship of the depth of field DOF with the focal point distance f and the subject distance x based on formula 5 through formula 7. Circular plots illustrate a case where the focal point distance f is 100 m. Quadrangular plots illustrate a case where the focal point distance f is 80 m. Triangular plots illustrate a case where the focal point distance f is 50 m. F number is fixed at 3.5. It is clear from FIG. 7 that the smaller the subject distance x is and the longer the focal point distance f is, the shallower the depth of field DOF becomes in the case where the F number is fixed at a constant value.

[Data File Structure]

Figure 8:
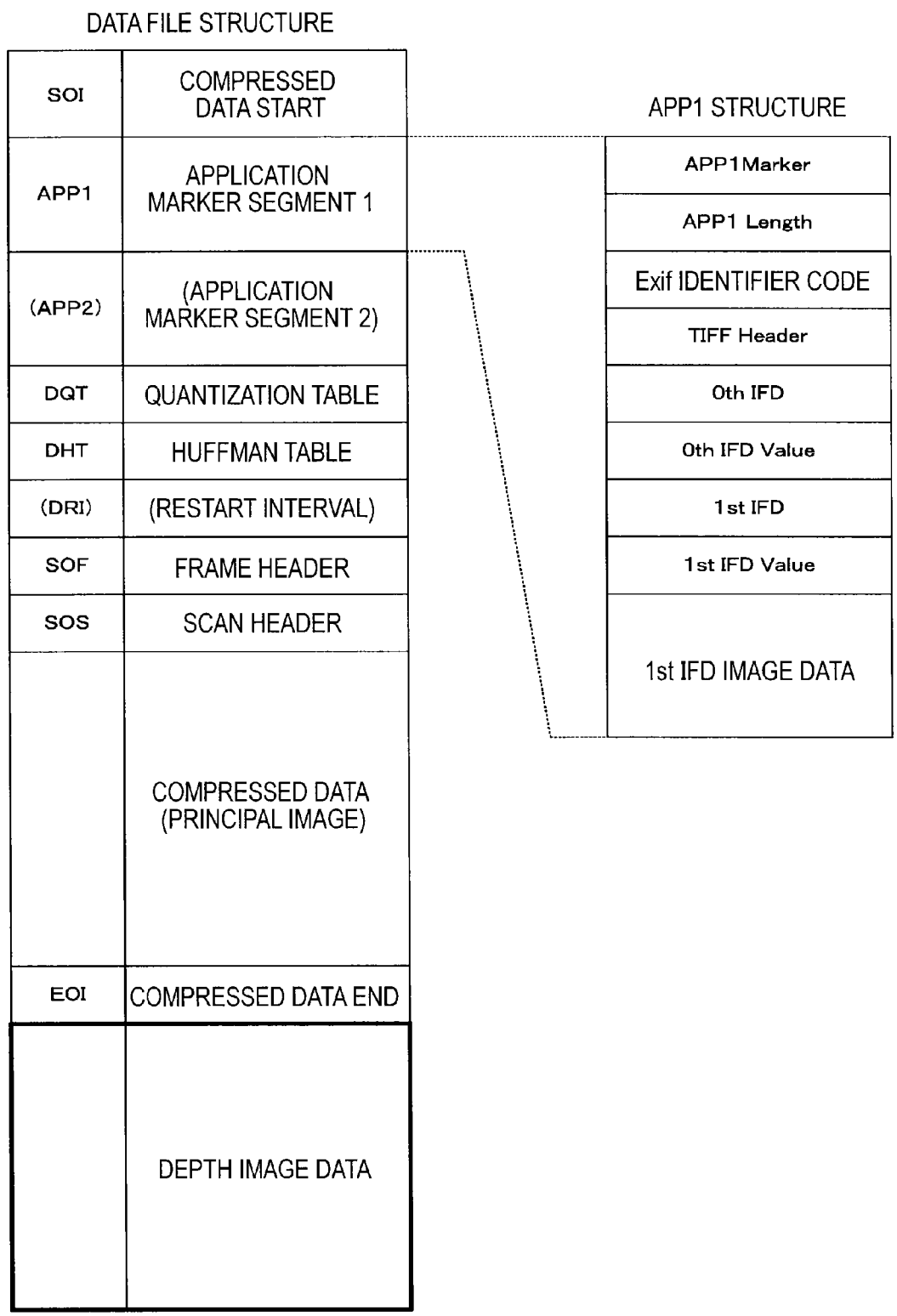
FIG. 8 is a diagram illustrating an example of a data structure of a data file according to the first embodiment.

FIG. 8 is a diagram illustrating an example of a data structure of a data file according to the first embodiment. The data file is created under the Exif standards, for example.

In the data file, a start of image (SOI), an application marker segment 1 (APP1), a define quantization table (DQT) and a define Huffman table (DHT) are sequentially stored. Then, following a start of frame header (SOF) and a start of scan header (SOS), a main body of compressed data is stored and an end of image (EOI) is stored. The compressed data is the data compressed in accordance with a compression format such as JPEG standards. Then, the depth image data created in the image processing device 300 is stored next to the end of image (EOI). Note that, though the image processing device 300 stores the depth image data next to the EOI of the Exif standards, the depth image data may be stored as long as the depth image data can be associated with the image data.

The APP1 is an area in which Exif attachment information is stored. In the APP1, an APP1 length is defined after an APP1 marker. Subsequently, after an Exif identifier code, a TIFF header, a principal image IFD (0th IFD), a principal image IFD value (0th IFD value) and the like are stored.

[Image Pickup Apparatus Operation Example]

Figure 9:
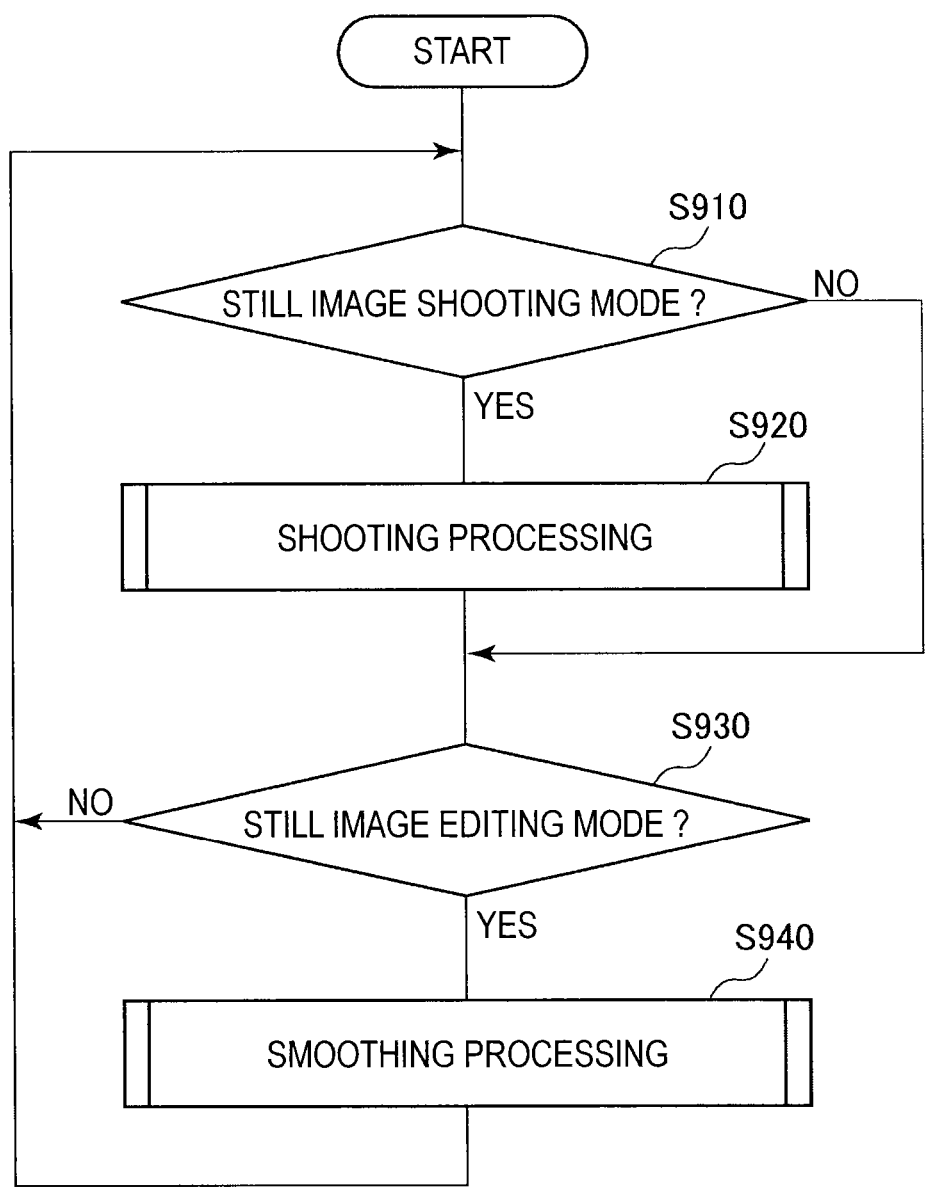
FIG. 9 is a flowchart illustrating an operation example of the image pickup apparatus according to the first embodiment.

FIG. 9 is a flowchart illustrating an operation example of the image pickup apparatus 100 according to the first embodiment. This operation starts when the image pickup apparatus 100 is powered on, for example. The image pickup apparatus 100 determines whether own current status is in a still image shooting mode (step S910). In the case where the own current status is in the still image shooting mode (step S910: Yes), the image pickup apparatus 100 performs shooting processing for shooting a subject (step S920).

In the case where the own current status is not in the still image shooting mode (step S910: No) or after performing step S920, the image pickup apparatus 100 determines whether the own current status is in a still image editing mode (step S930). In the case where the own current status is in the still image editing mode (step S930: Yes), the image pickup apparatus 100 performs smoothing processing (step S940). In the case where the own current status is not in the still image editing mode (step S930: No) or after performing step S940, the image pickup apparatus 100 returns to step S910.

Figure 10:
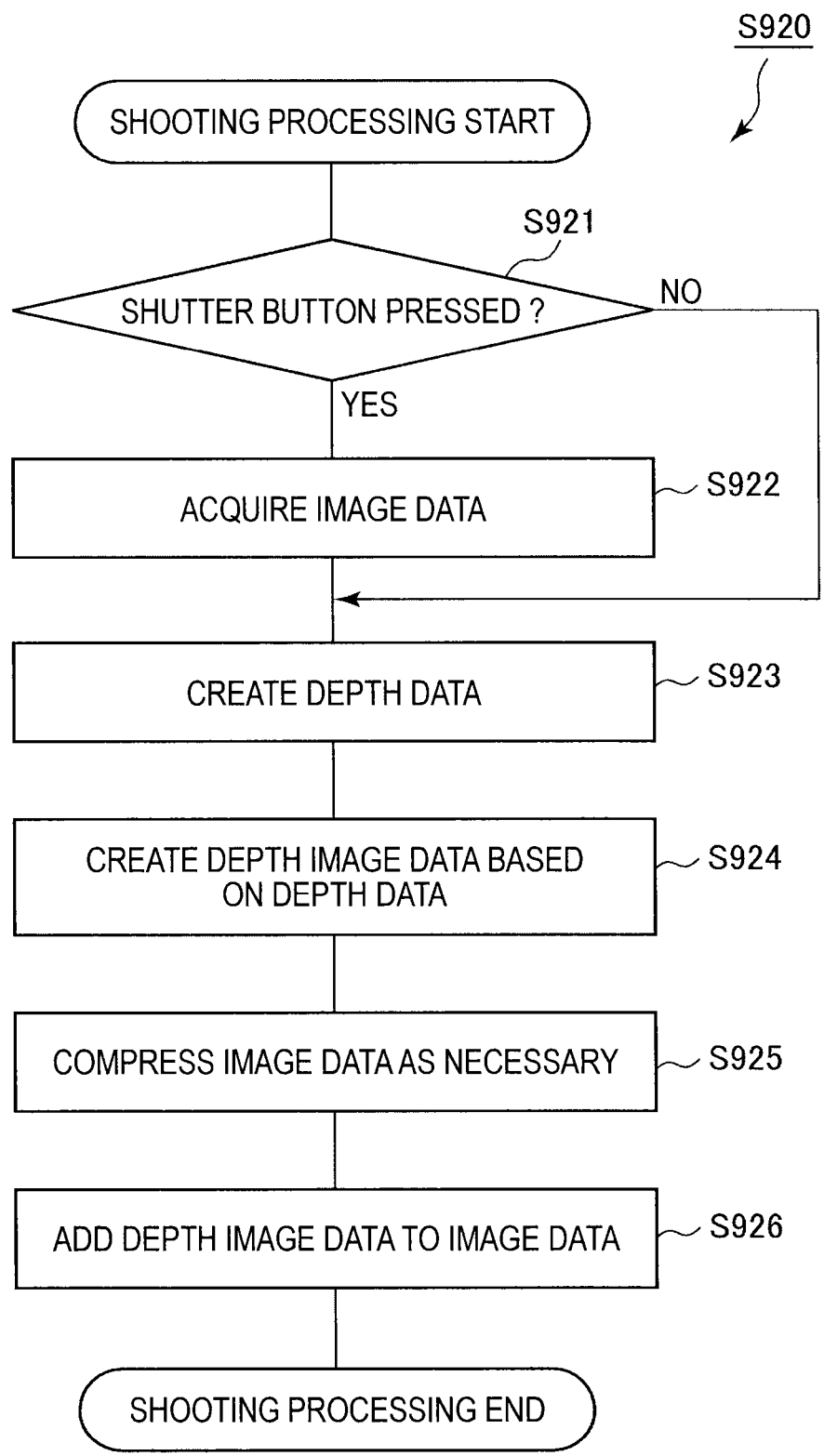
FIG. 10 is a flowchart illustrating an example of shooting processing according to the first embodiment.

FIG. 10 is a flowchart illustrating an example of the shooting processing according to the first embodiment. The image pickup apparatus 100 determines whether a shutter button is pressed (step S921). In the case where the shutter button is pressed (step S921: Yes), the image processing device 300 in the image pickup apparatus 100 acquires image data (step S922).

In the case where the shutter button is not pressed (step S921: No) or after performing step S922, the image processing device 300 creates the depth data based on the image data (step S923). Then, the image processing device 300 creates the depth image data from the depth data by using formula 1 (step S924). The image processing device 300 compresses the image data as necessary (step S925). The image processing device 300 stores the image data by adding the depth image data to the image data (step S926). After performing step S926, the image pickup apparatus 100 terminates the shooting processing.

Figure 11:
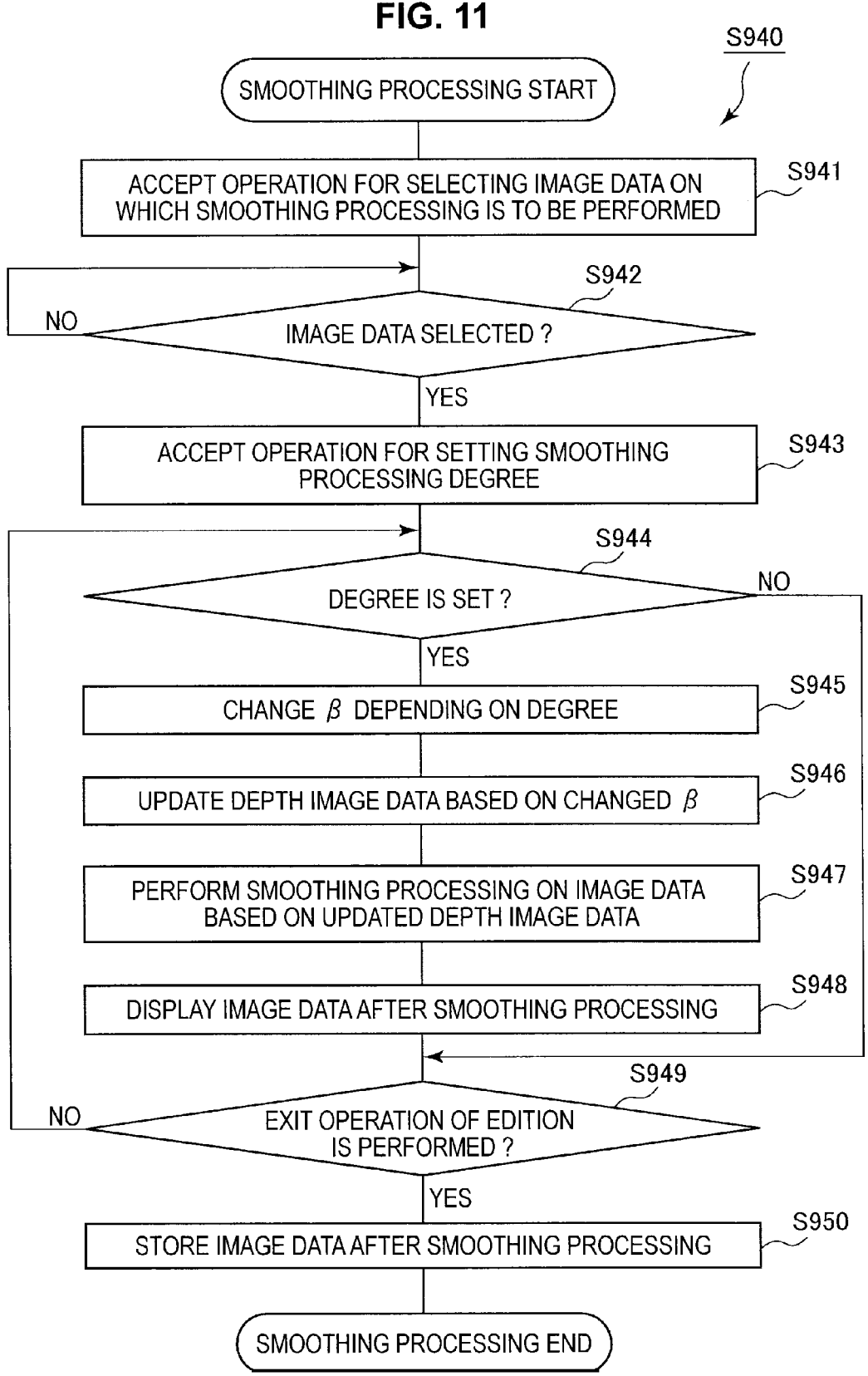
FIG. 11 is a flowchart illustrating an example of smoothing processing according to the first embodiment.

FIG. 11 is a flowchart illustrating an example of the smoothing processing according to the first embodiment. The image pickup apparatus 100 accepts processing for selecting image data on which the smoothing processing is to be performed (step S941). The image pickup apparatus 100 determines whether the image data is selected (step S942). In the case where the image data is not selected (step S942: No), the image pickup apparatus 100 returns to step S942. In the case where the image data is selected (step S942: Yes), the image pickup apparatus 100 accepts an operation setting the degree of the smoothing processing as the emphasis degree of the perspective (step S943). Subsequently, the image pickup apparatus 100 determines whether the degree is set (step S944).

In the case where the degree is set (step S944: Yes), the image processing device 300 in the image pickup apparatus 100 changes the coefficient β depending on the set value of the degree (step S945). The image processing device 300 updates the depth image data based on the changed coefficient β (step S946). The image processing device 300 performs the smoothing processing on the image data based on the updated depth image data (step S947). The image pickup apparatus 100 displays the image data after the smoothing processing (step S948).

In the case where the degree is not set (step S944: No) or after performing step S948, the image pickup apparatus 100 determines whether an exit operation of edition is performed (step S949). In the case where the exit operation of edition is not performed (step S949: No), the image pickup apparatus 100 returns to step S944. In the case where the exit operation of edition is performed (step S949: Yes), the image pickup apparatus 100 stores the image data after the soothing processing (step S950). After performing step S950, the image pickup apparatus 100 terminates the smoothing processing.

Figure 12:
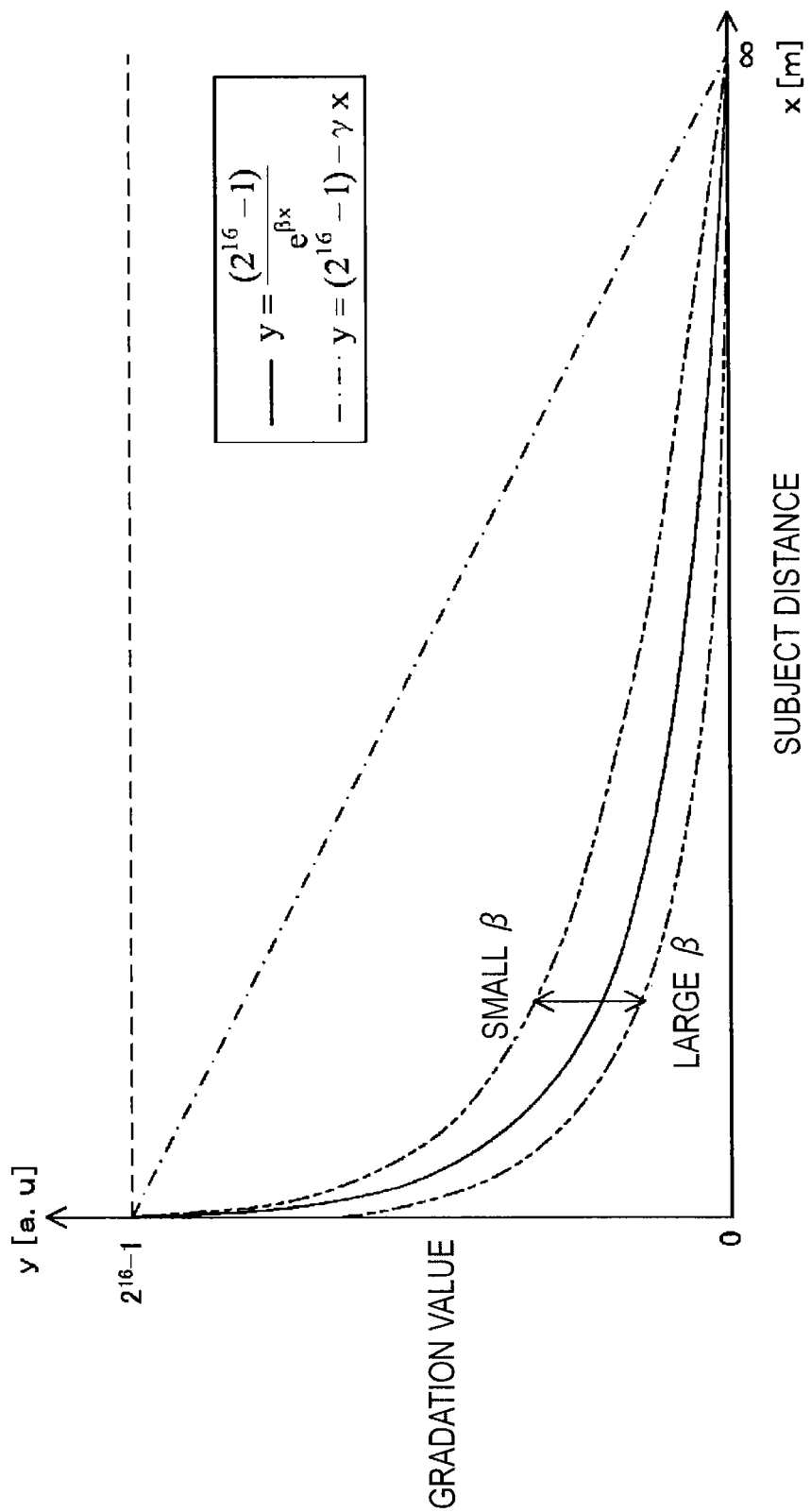
FIG. 12 is a graph illustrating an example of an adjustable range of a coefficient according to the first embodiment.

FIG. 12 is a graph illustrating an example of an adjustable range of the coefficient β according to the first embodiment. When a value of the coefficient is changed within a certain range, a function characteristic of formula 1 varies. The larger the coefficient β is, the closer a curved line of the function in formula 1 approaches a straight line where y=0. As a result, the emphasis degree of the perspective is increased. On the contrary, the lower the coefficient β is, the more the emphasis degree of the perspective is decreased.

Figure 13A:
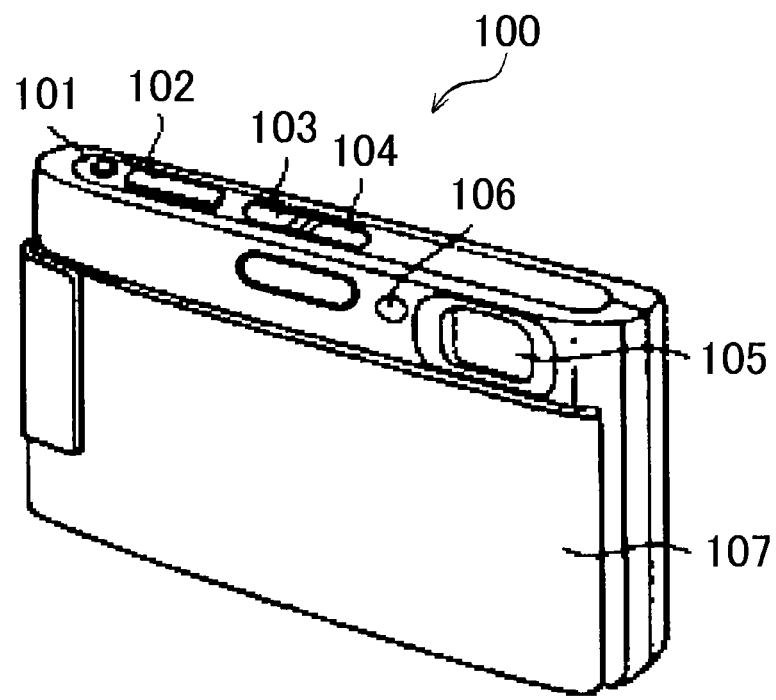
FIGS. 13A, 13B are overall views illustrating a configuration example of the image pickup apparatus according to the first embodiment.
Figure 13B:
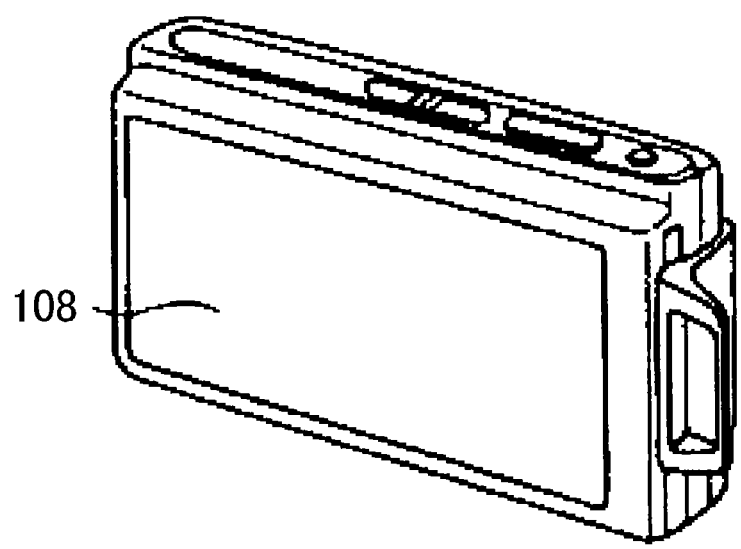

FIGS. 13A, 13B are overall views illustrating a configuration example of the image pickup apparatus 100 according to the first embodiment. FIG. 13A illustrates an example of a top face and a front face of the image pickup apparatus 100 and FIG. 13B illustrates an example of a back face of the image pickup apparatus 100. On the top face of the image pickup apparatus 100, a zoom lever 101, a shutter button 102, a play button 103 and a power button 104 are provided. On the front face of the image pickup apparatus 100, a shooting lens 105, an AF (Auto Focus) illuminator 106 and a lens cover 107 are provided. On the back face of the image pickup apparatus 100, a touch screen 108 is provided.

The zoom lever 101 is a button for performing a zoom control operation. The shutter button 102 is a button for shooting photos of a subject. The play button 103 is a button for displaying image data. The power button 104 is a button for powering on or off the image pickup apparatus 100. The shooting lens 105 is the lens for capturing an image. The AF illuminator 106 emits light when an autofocus function is activated. The lens cover 107 is a component movable to a position to cover the lens for protecting the lens. The touch screen 108 is a display enabling operations of the image pickup apparatus 100 by touch of a finger or the like.

The operation part 110 illustrated in FIG. 1 includes the zoom lever 101, the shutter button 102, the play button 103 and the power button 104 illustrated in FIG. 13A. The operation part 110 and the display part 200 illustrated in FIG. 1 includes the touch screen 108 illustrated in FIG. 13B.

As described above, according to the first embodiment of the present technology, the image processing device 300 acquires the image and the depth and converts the depth in accordance with the function having the characteristic to nonlinearly approach the predetermined value with increase in depth. The image processing device 300 stores the converted depth in association with the image. When the image processing device 300 performs the smoothing processing based on the converted depth, the perspective is emphasized to a degree higher than the degree in the smoothing processing proportional to the depth.

First Modification

A first modification of the first embodiment will be described with reference to FIG. 14. Unlike the first embodiment, an image processing device 300 of the first modification converts the depth such that a gradation value y increases with increase in depth x. The image processing device 300 according to the first modification converts the depth by using the following formula 12, for example, instead of formula 1.

$$Y=\alpha\{1-e^{\wedge}(-\beta x)\} \qquad \text{Formula 12}$$

Figure 14:
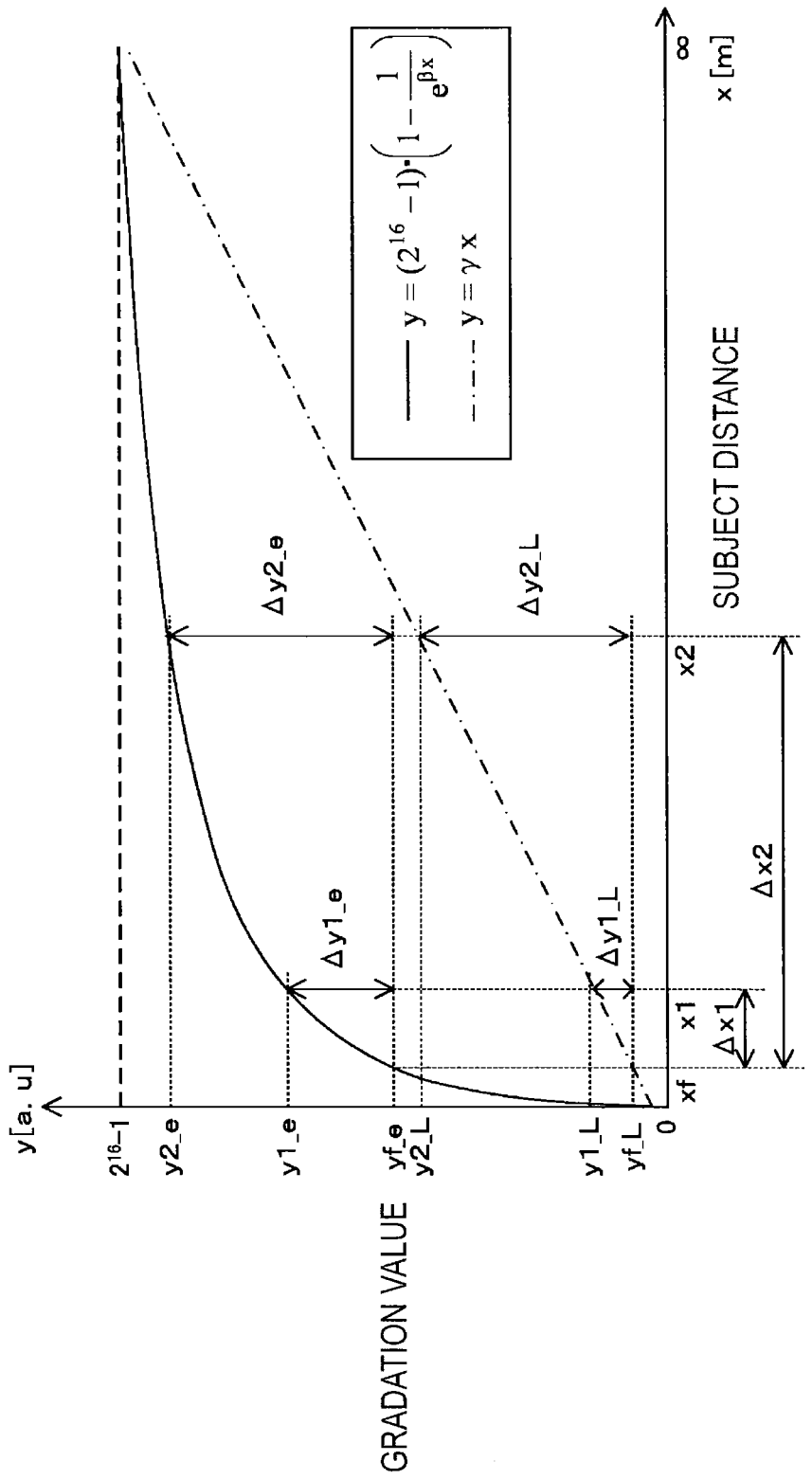
FIG. 14 is a graph illustrating an example of a relationship between a gradation value and a subject distance according to a modification according to the first embodiment.
Figure 15:
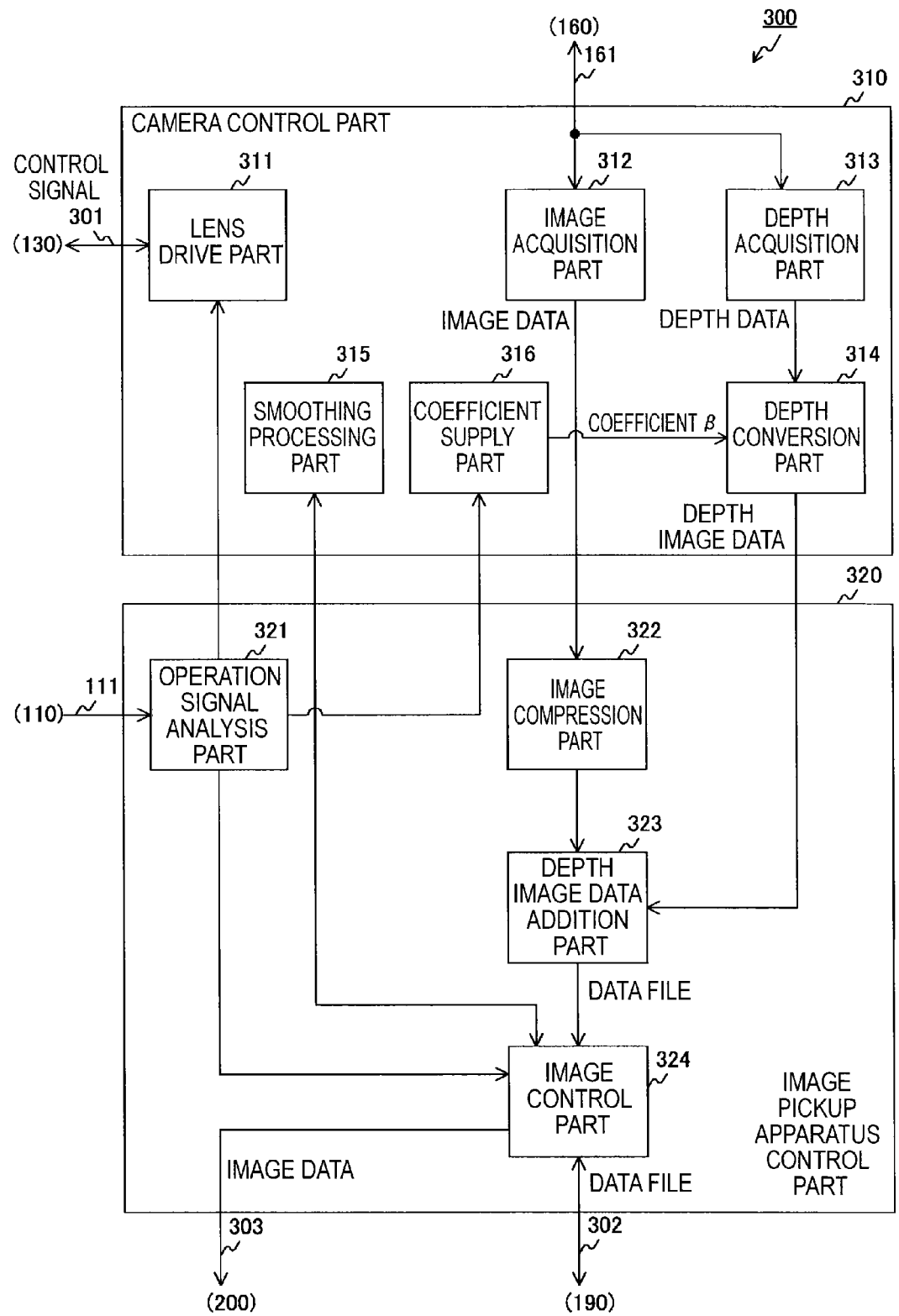
FIG. 15 is a block diagram illustrating a configuration example of an image processing device according to a second embodiment.

FIG. 14 is a graph illustrating an example of a relationship between a gradation value y and a subject distance (depth) x according to the first modification. In the first embodiment, the depth is converted to the gradation value y that decreases nonlinearly depending on increase in depth x by using formula 1. On the other hand, in the case of using formula 12 as illustrated in FIG. 14, the depth x is converted to the gradation value y that increases nonlinearly depending on increase in depth x.

2. Second Embodiment

Image Processing Device Configuration Example

Next, a second embodiment of the present technology will be described with reference to FIG. 15 through FIG. 19. FIG.

15 is a block diagram illustrating a configuration example of an image processing device 300 according to the second embodiment. As described above, the image processing device 300 includes the camera control part 310 and the image pickup apparatus control part 320. Unlike the first embodiment, the image processing device 300 according to the second embodiment further includes a coefficient supply part 316 in a camera control part 310. Furthermore, an operation signal analysis part 321 according to the second embodiment outputs a shooting mode among shooting conditions further to the coefficient supply part 316. The shooting mode is the information indicating the shooting conditions such as the type of a shooting target and a distance to the shooting target. For example, the shooting mode includes a macro mode, a landscape mode and a normal mode. The macro mode is the mode for shooting a subject near the lens. The landscape mode is the mode for shooting a distant subject. The normal mode is the mode for shooting a subject at a distance between that in the macro mode and that in the landscape mode.

The coefficient supply part 316 supplies the coefficient β depending on the shooting conditions. In the coefficient supply part, values of the coefficient of the respective shooting mode are preliminarily set. The coefficient supply part 316 receives the shooting mode from the operation signal analysis part 321 and outputs the coefficient β corresponding to the received shooting mode to the depth conversion part 314. For example, the value larger than the set value in the normal mode is set in the macro mode, and the value smaller than the set value in the normal mode is set in the landscape mode. The depth conversion part 314 substitutes the value of the coefficient β from the coefficient supply part 316 in formula 12 to convert the depth.

Figure 16:
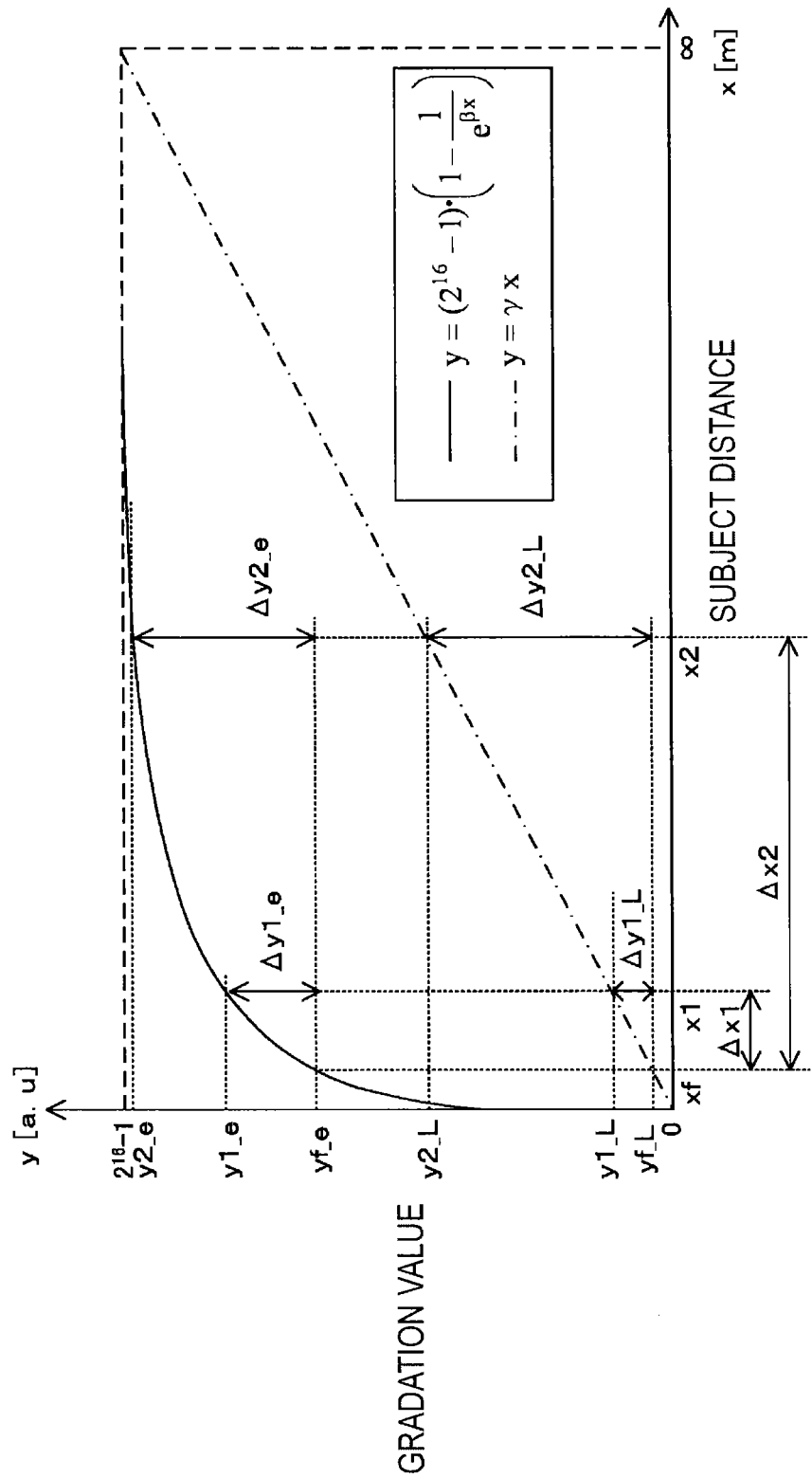
FIG. 16 is a graph illustrating an example of a relationship between a gradation value and a subject distance according to the second embodiment in the case where a shooting mode is in a macro mode.

FIG. 16 is a graph illustrating an example of a relationship between the gradation value and the subject distance according to the second embodiment in the case where the shooting mode is in the macro mode. As described above, the value larger than the set value in the normal mode is set to the coefficient β in the macro mode. Accordingly, the emphasis degree of the perspective becomes relatively high. For example, a ratio of $\Delta y2\_e$ to $\Delta y1\_e$ becomes larger than that in the normal mode, and accordingly, the blurring amount of the subject at x1 becomes relatively large.

Figure 17:
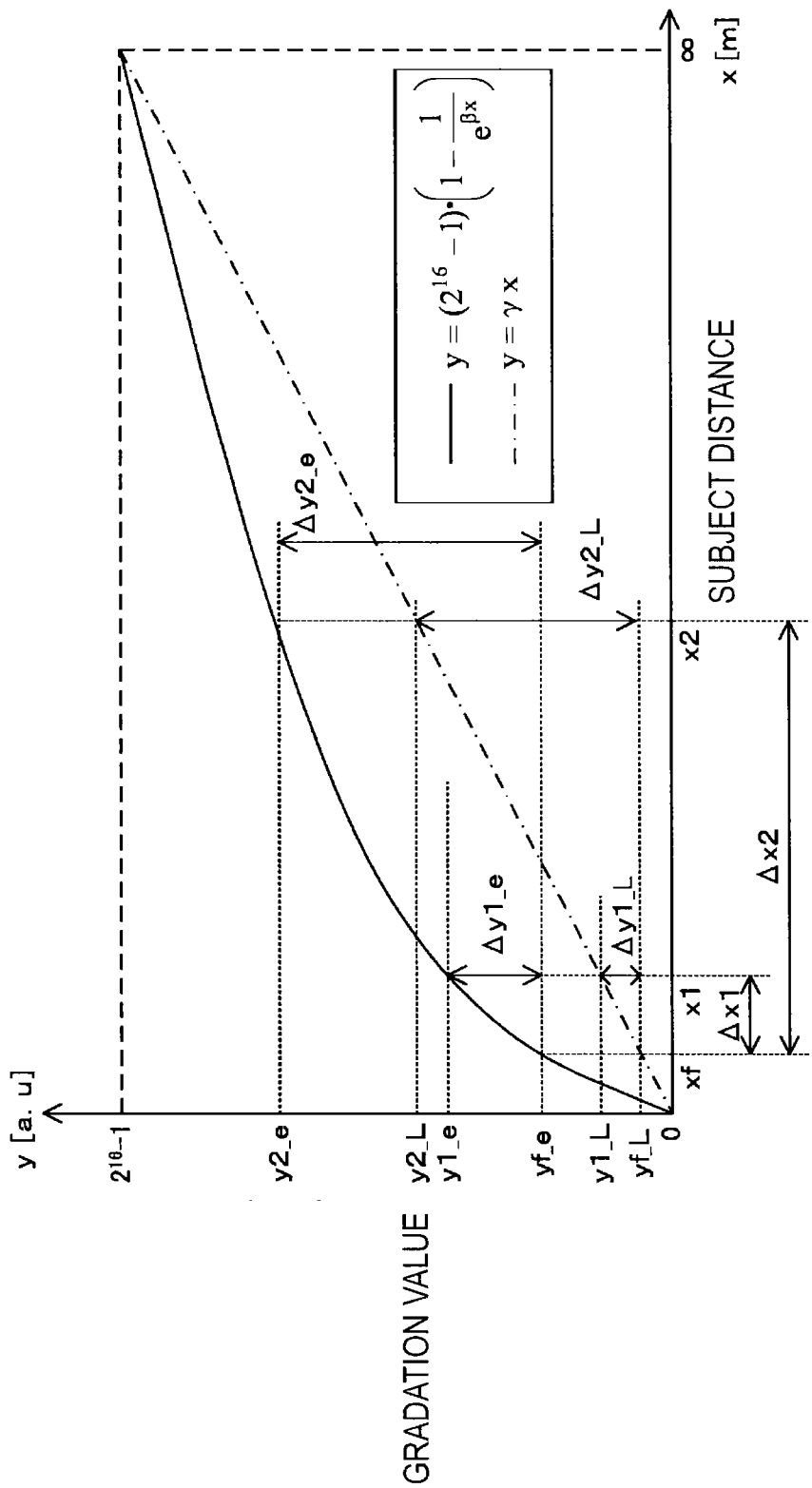
FIG. 17 is a graph illustrating an example of a relationship between the gradation value and the subject distance according to the second embodiment in the case where the shooting mode is in a landscape mode.

FIG. 17 is a graph illustrating an example of a relationship between the gradation value and the subject distance according to the second embodiment in the case where the shooting mode is in the landscape mode. As described above, the value smaller than the set value in the normal mode is set to the coefficient β in the landscape mode. Accordingly, the emphasis degree of the perspective becomes relatively low. For example, a ratio of $\Delta y2\_e$ to $\Delta y1\_e$ becomes smaller than that in the normal mode, and accordingly, the blurring amount of the subject at x1 becomes relatively small.

[Image Pickup Apparatus Operation Example]

Figure 18:
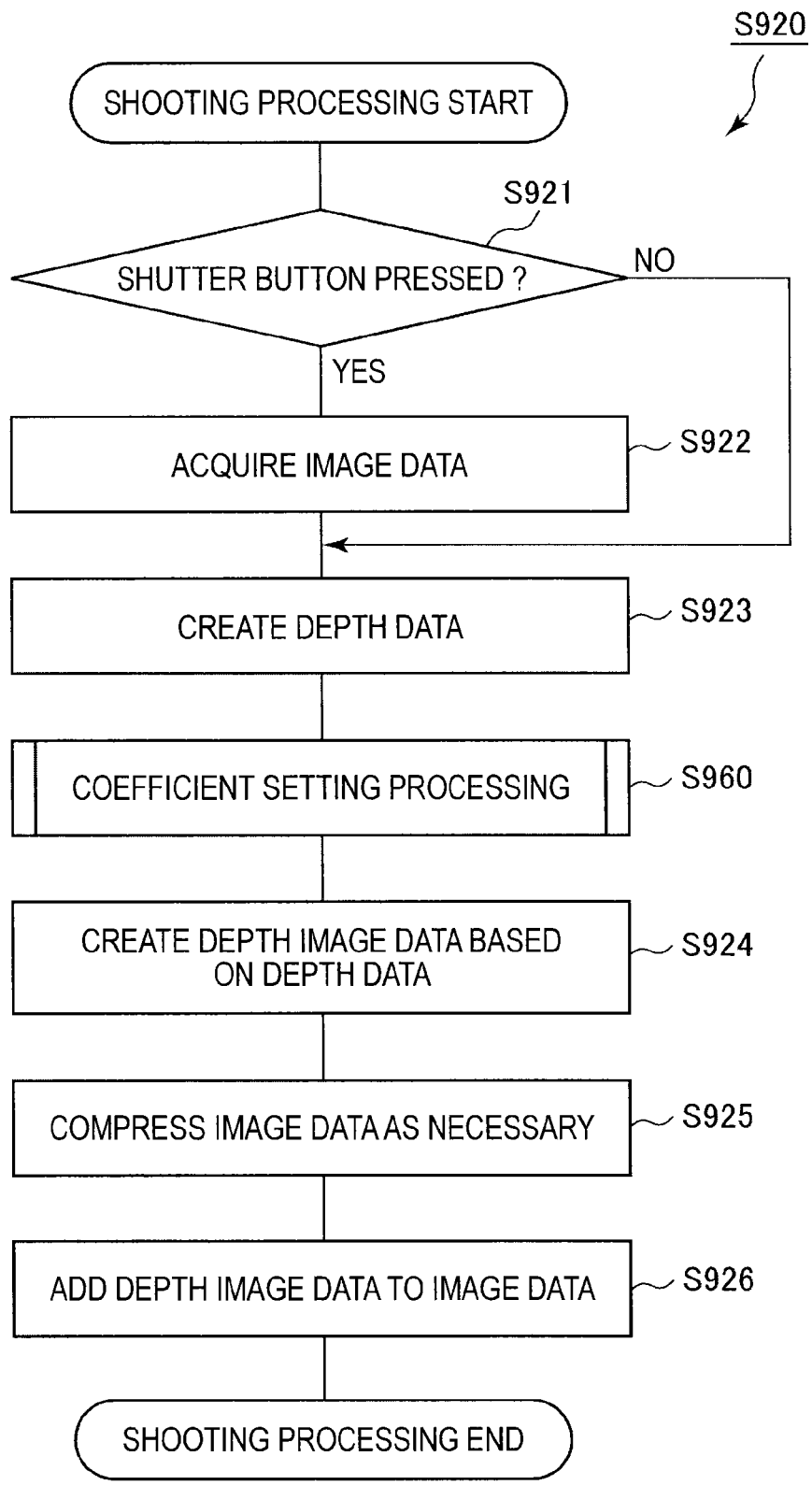
FIG. 18 is a flowchart illustrating an example of shooting processing according to the second embodiment.

FIG. 18 is a flowchart illustrating an example of the shooting processing according to the second embodiment. Unlike the first embodiment, coefficient setting processing (step S960) is further performed in the shooting processing according to the second embodiment after performing step S923. The image pickup apparatus 100 performs step S924 after performing step S960.

Figure 19:
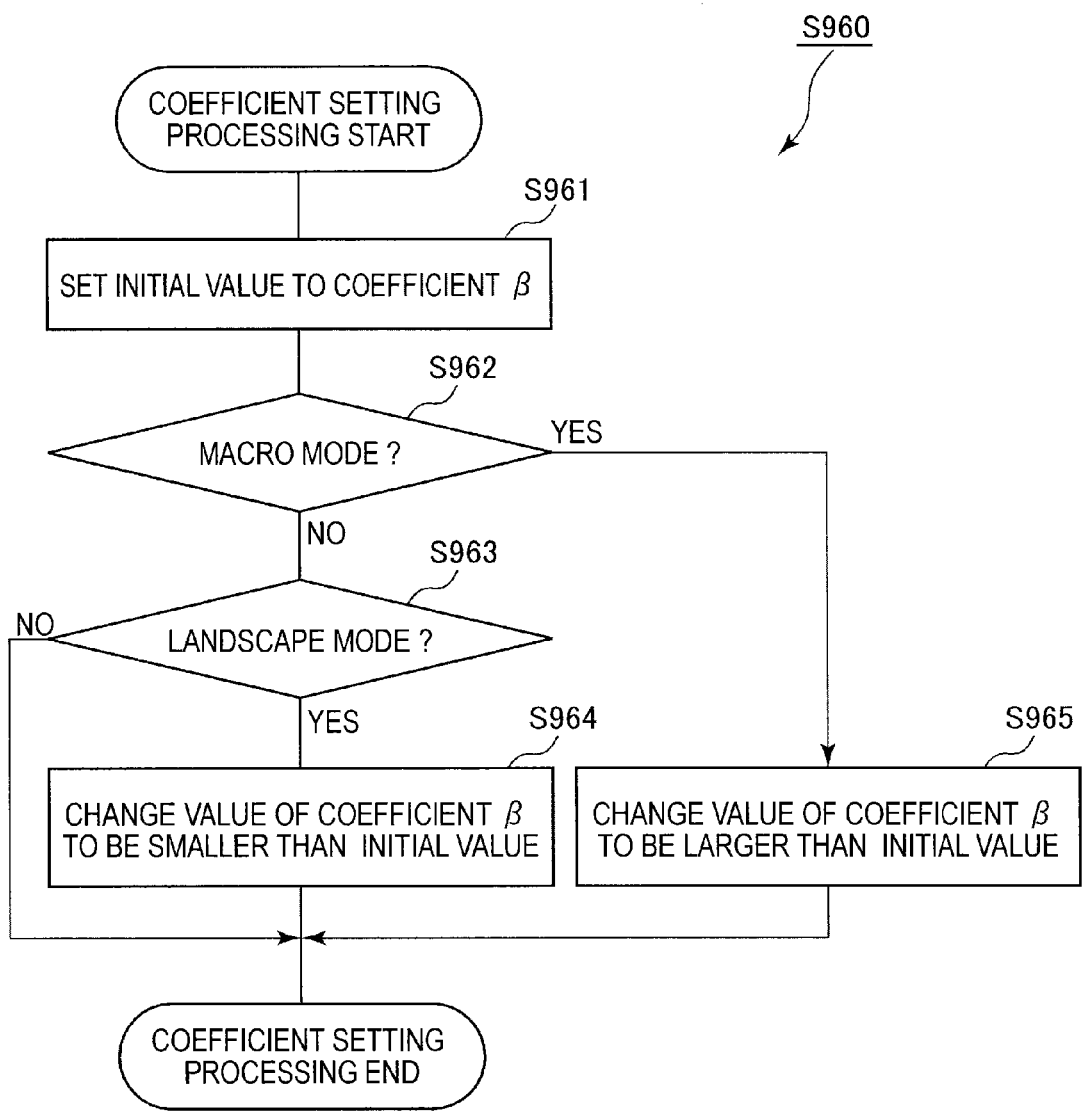
FIG. 19 is a flowchart illustrating an example of coefficient setting processing according to the second embodiment.

FIG. 19 is a flowchart illustrating an example of the coefficient setting processing according to the second embodiment. The image processing device 300 sets the initial value to the coefficient β. Here, the initial value is the setting value in the normal mode, for example (step S961). The image processing device 300 determines whether the shooting mode is the macro mode (step S962). In the case where the shooting mode is not the macro mode (step S962: No), the image processing device 300 determines whether the shooting mode is the landscape mode (step S963). In the case where the shooting mode is the landscape mode (step S963: Yes), the image processing device 300 changes the value of the coefficient β to a value smaller than the initial value (step S964). In the case where the shooting mode is the macro mode (step S962: Yes), the image processing device 300 changes the value of the coefficient β to a value larger than the initial value (step S965).

In the case where the shooting mode is not the landscape mode (step S963: No) or after performing step S964 or step S965, the image processing device 300 terminates the coefficient setting processing.

As described above, according to the second embodiment of the present technology, the coefficient supply part 316 supplies the coefficient β depending on the shooting conditions, and the depth conversion part 314 converts the depth based on the supplied coefficient β. Because the characteristic of the function varies depending on the coefficient β, the depth is converted by the function of the characteristic depending on the shooting conditions. As a result, the smoothing processing suitable for the shooting conditions is performed based on the converted depth.

3. Third Embodiment

Image Processing Device Configuration Example

Figure 20:
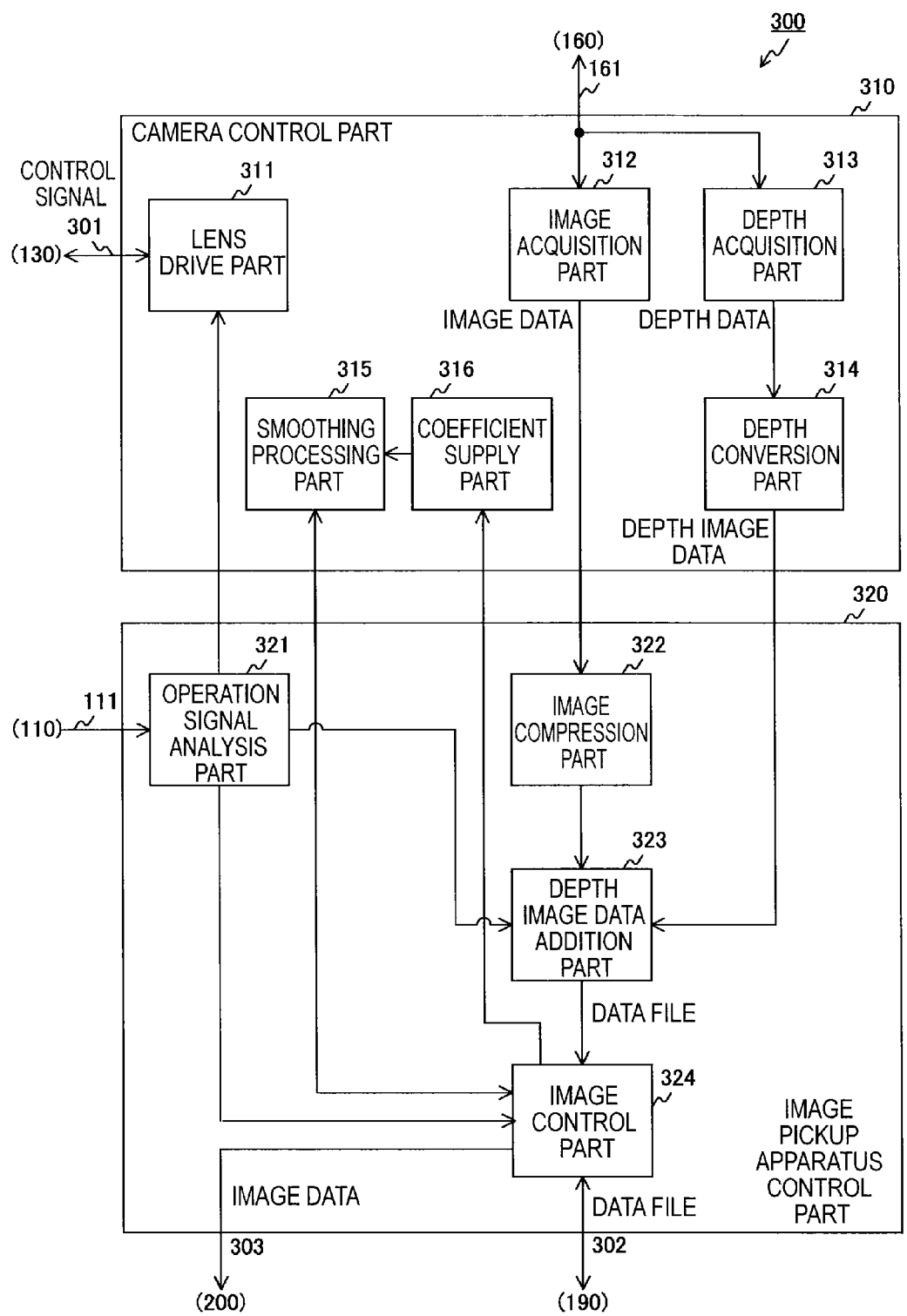
FIG. 20 is a block diagram illustrating a configuration example of an image processing device according to a third embodiment.

Next, a third embodiment of the present technology will be described with reference to FIG. 20 through FIG. 23. FIG. 20 is a block diagram illustrating a configuration example of an image processing device 300 according to the third embodiment. As described above, the image processing device 300 includes the camera control part 310 and the image pickup apparatus control part 320. Unlike the first embodiment, in the image processing device 300 according to the third embodiment, a coefficient supply part 316 supplies a coefficient depending on the shooting mode after the image data is stored. Further, an operation signal analysis part 321 according to the third embodiment outputs the shooting mode further to a depth image data addition part 323. The depth image data addition part 323 according to the third embodiment stores the image data in the image data storage part 190 by adding the shooting mode to the image data. The image control part 324 outputs the shooting mode added to the image data to a coefficient supply part 316 when reading out the image data.

The coefficient supply part 316 according to the third embodiment receives the shooting mode from the image control part 324 and outputs the coefficient β depending on the shooting mode to the smoothing processing part 315.

[Data File Structure]

Figure 21:
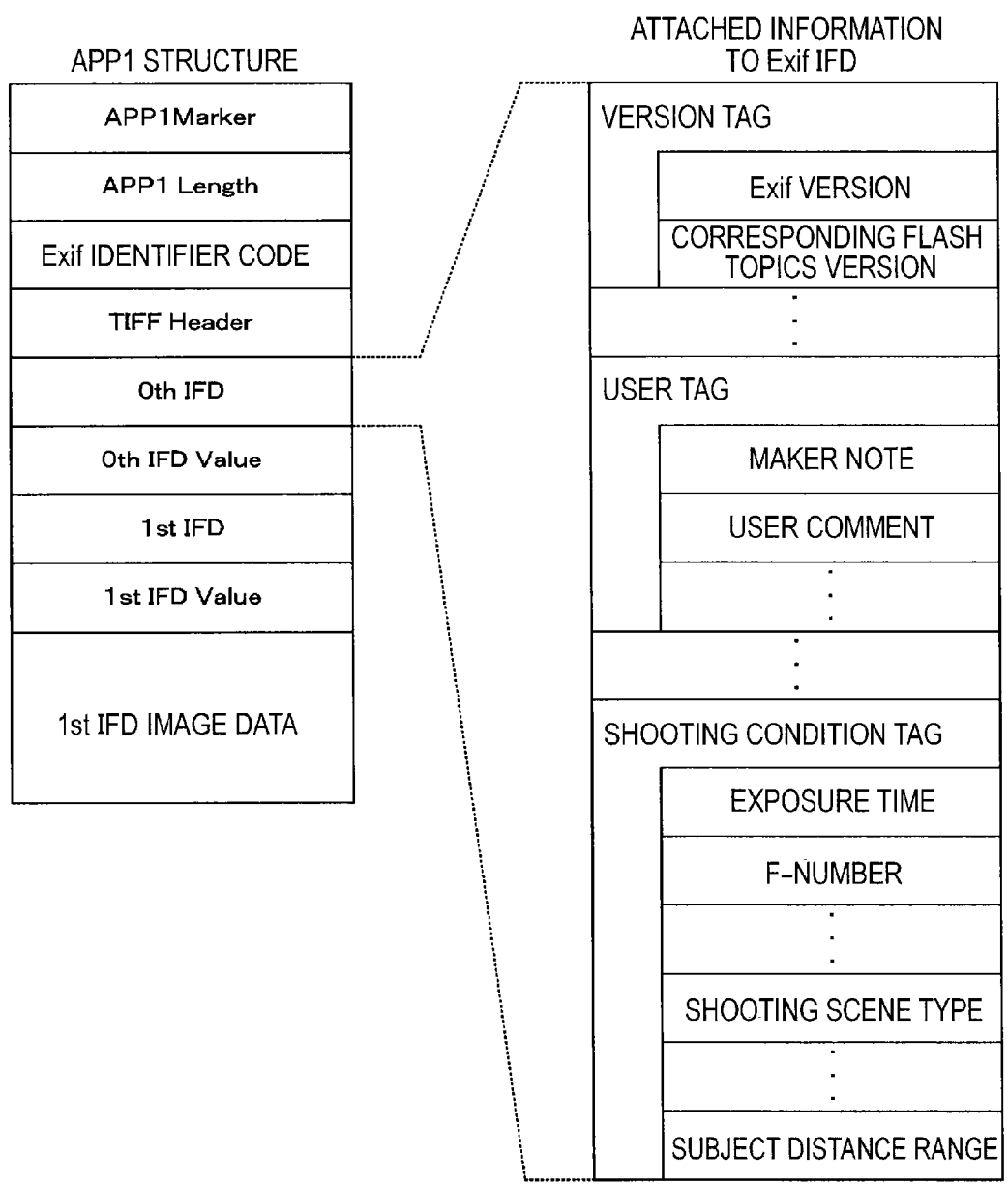
FIG. 21 is a diagram illustrating an example of a data structure of attached information according to the third embodiment.

FIG. 21 is a diagram illustrating an example of a data structure of attached information in a data file according to the third embodiment. The attached information (tag) of the image data is stored in the 0th IFD in the application marker segment (APP1). The attached information is segmented into segments such as a version tag, a user information tag and a shooting condition tag. The version tag includes an Exif version and a corresponding flash pix version. The user information tag includes a maker note, a user comment and the like. The shooting condition tag includes an exposure time, F-number, a shooting scene type, a subject distance range and the like. Here, whether a shooting target is normal, a landscape or a person is stored in an area of the shooting scene type. Further, it is stored in an area of the subject distance range which a distance to the subject is classified into macro, a near view or a distant view.

In the third embodiment, the normal mode, the landscape mode or the macro mode is set as the shooting mode. Information related to the shooting modes is stored in areas of the shooting scene type and the subject distance range. Note that, the image processing device 300 may store the information related to the shooting mode in another area such as an area of the maker note.

[Image Pickup Apparatus Operation Example]

Figure 22:
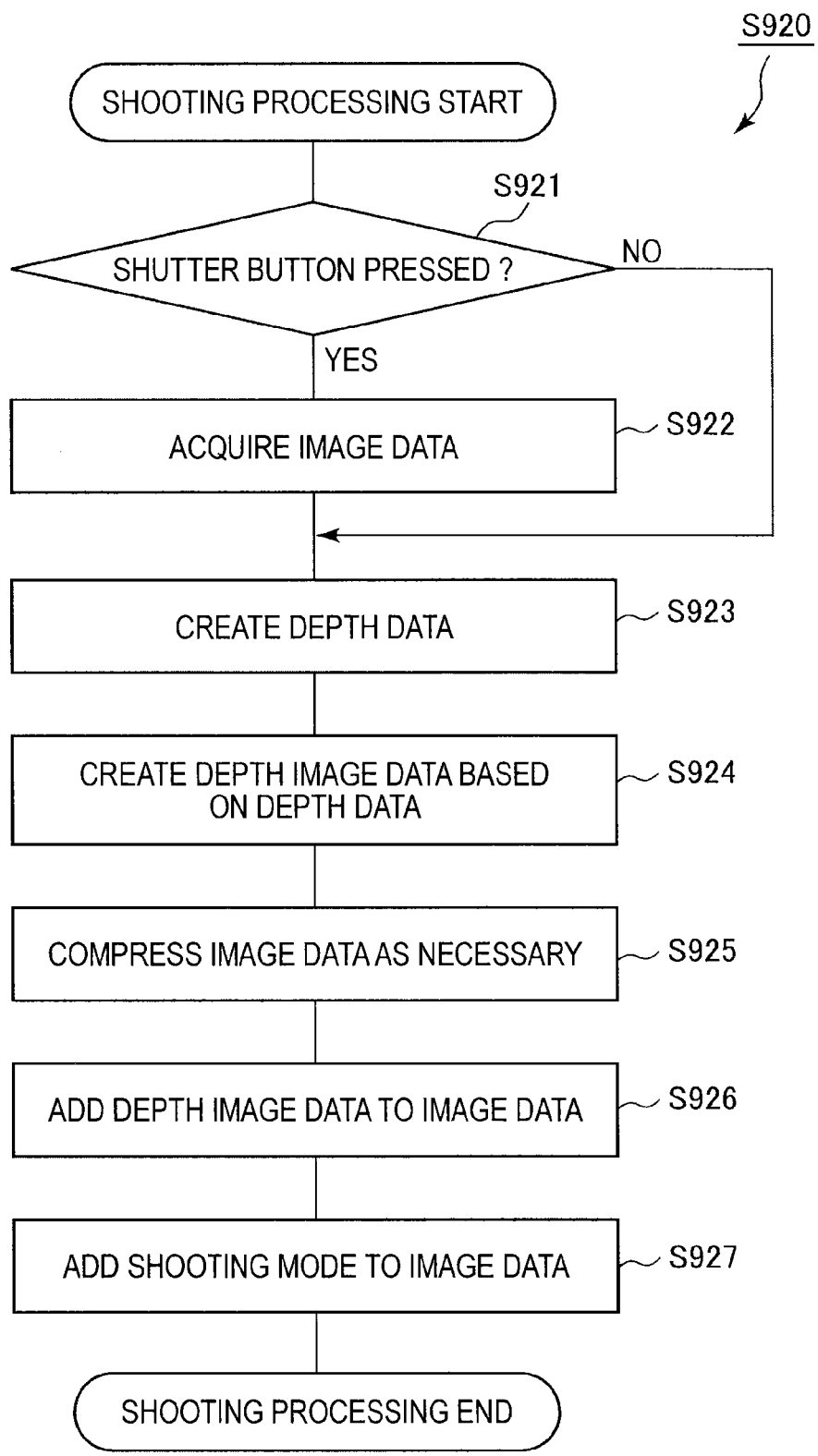
FIG. 22 is a flowchart illustrating an example of shooting processing according to the third embodiment.

FIG. 22 is a flowchart illustrating an example of the shooting processing according to the third embodiment. Unlike the first embodiment, the shooting processing according to the third embodiment, the image processing device 300 adds the shooting mode to the image data after performing step S926 (step S927). The image pickup apparatus 100 terminates the shooting processing after performing step S927.

Figure 23:
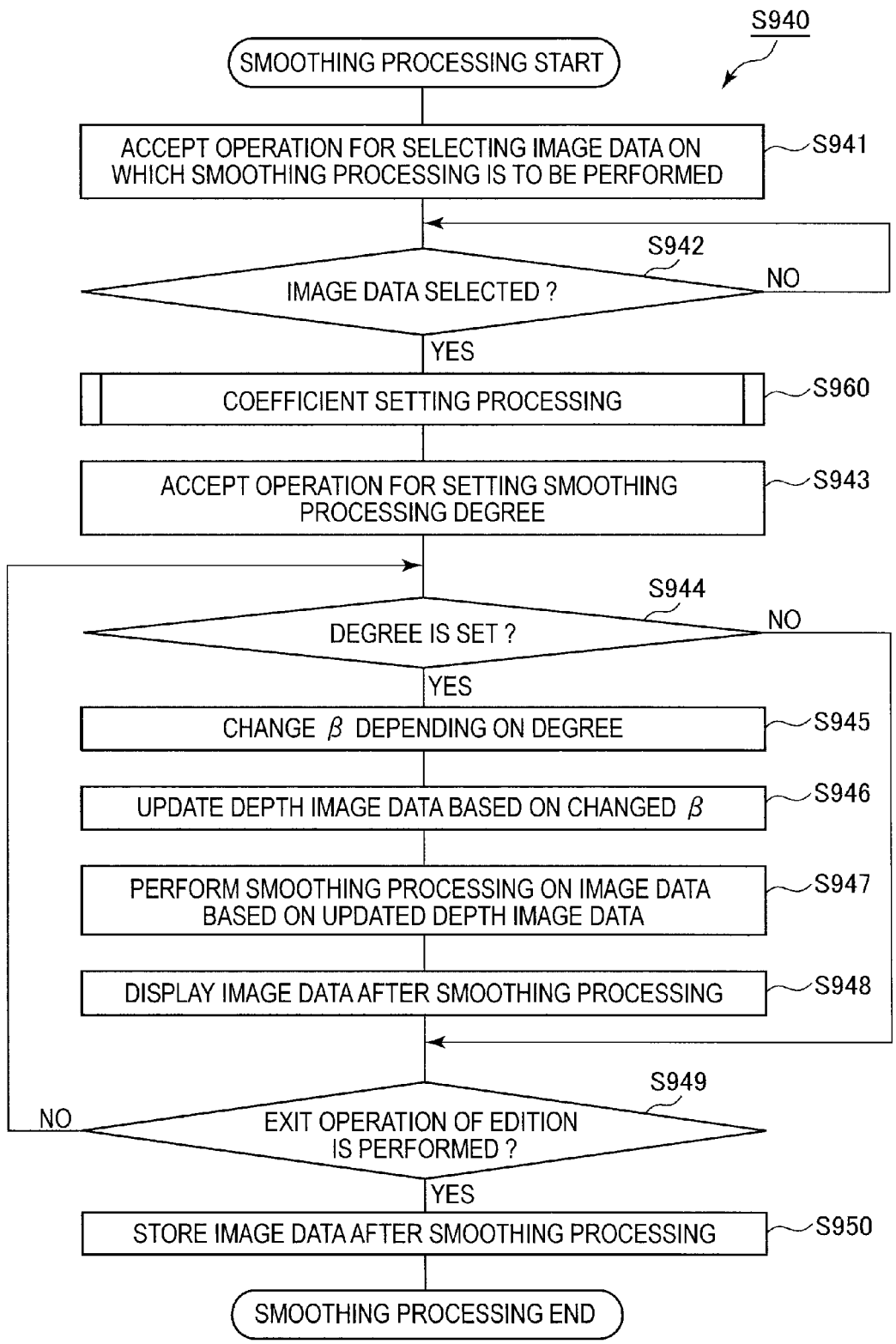
FIG. 23 is a flowchart illustrating an example of smoothing processing according to the third embodiment.

FIG. 23 is a flowchart illustrating an example of the smoothing processing according to the third embodiment. Unlike the first embodiment, the image processing device 300 further performs coefficient setting processing (step S960) in the case where the image data is selected (step S942: Yes) in the smoothing processing according to the third embodiment. The coefficient setting processing (step S960) is processing similar to the coefficient setting processing according to the second embodiment. The image processing device 300 accepts an operation of setting a degree of the smoothing processing (step S943) after performing step S960.

As described above, according to the third embodiment, the depth image data addition part 323 stores the image data by adding the shooting condition to the image data and the coefficient supply part 316 reads out the shooting conditions and supplies the coefficient depending on the shooting conditions. Because the characteristic of the function varies depending on the coefficient $\beta$, the depth is converted by the function of the characteristic depending on the shooting conditions. As a result, the smoothing processing suitable for the shooting conditions is performed based on the converted depth.

The above-described embodiments indicate examples for embodying the present disclosure and matters according to the embodiments each have correspondence relation with claimed elements in the appended claims as explained below. Similarly, claimed elements in the appended claims each have corresponding relation with matters according to the embodiments of the present disclosure having the same name. However, the present disclosure is not limited to the embodiments. Various modifications can be applied to the present disclosure without departing from the spirit of the present disclosure.

Further, the above-described procedures in the above embodiments may be regarded as a method having the series of steps or as a program causing a computer to execute the series of steps and as a storage medium storing the program. The storage medium may include CD (Compact Disc), MD (MiniDisc), DVD (Digital Versatile Disk), a memory card, a Blu-ray Disc (registered trademark), a nonvolatile memory such as a flash memory and the like.

Additionally, the present technology may also be configured as below.

(1) An image processing device comprising:
  an image acquisition part acquiring an image;
  a depth acquisition part acquiring a depth associated with a pixel in the image;
  a depth conversion part converting the depth in accordance with a function having a characteristic to nonlinearly approach a predetermined value with an increase in the depth; and
  a storage part storing the converted depth in association with the image.

(2) The image processing device according to (1), further comprising a smoothing processing part performing smoothing processing on the image to a degree depending on the converted depth corresponding to the pixel in the image based on a converted depth corresponding to a predetermined pixel in the image.

(3) The image processing device according to (2), wherein the function is a function with a characteristic that varies depending on a coefficient, and
  the smoothing processing part performs the smoothing processing based on the depth converted in accordance with the characteristic.

(4) The image processing device according to (3), wherein the function is an exponential function defined by the following formula:
  $Y=\alpha \times e\hat{}(-\beta x)$, where x is the depth, y is an output, e is a base of natural logarithm, $\alpha$ is a predetermined constant and $\beta$ is the coefficient.

(5) The image processing device according to (3), wherein the function is an exponential function defined by the following formula:
  $Y=\alpha \times \{1-e\hat{}(-\beta x)\}$, where x is the depth, y is an output, e is a base of natural logarithm, $\alpha$ is a predetermined constant and $\beta$ is the coefficient.

(6) The image processing device according to any one of (3) to (5), further comprising a coefficient supply part supplying a value of the coefficient depending on a shooting condition under which the image is captured.

(7) The image processing device according to (6), wherein the storage part further stores the shooting condition in association with the image, and
  the coefficient supply part supplies the coefficient depending on the stored shooting condition.

(8) The image processing device according to any one of (1) to (7), wherein the depth conversion part creates an aggregation of the pixels as a depth image, each pixel having the converted depth value as a pixel value.

(9) The image processing device according to (8), further comprising a compression part compressing the depth image in accordance with a predetermined image compression format, and
  the storage part stores the compressed depth image in association with the image.

(10) A method of controlling an image processing device comprising:
  acquiring, with an image acquisition part, an image;
  acquiring, with a depth acquisition part, a depth associated with a pixel in the image;
  converting, with a depth conversion part, the depth in accordance with a function having a characteristic to nonlinearly approach a predetermined value with an increase in the depth; and
  storing, with a storage part, the converted depth in association with the image.

(11) A program for causing a computer to execute:
  acquiring an image;
  acquiring a depth associated with a pixel in the image;
  converting the depth in accordance with a function having a characteristic to nonlinearly approach a predetermined value with an increase in the depth; and storing the converted depth in association with the image.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-182518 filed in the Japan Patent Office on Aug. 24, 2011, the entire content of which is hereby incorporated by reference.

What is claimed is:

1. An image processing device comprising:
a storage device; and
circuitry, coupled with the storage device, configured to convert, in accordance with a predetermined function with a characteristic that varies depending on a coefficient, depth associated with at least one of a plurality of pixels within image data to have a nonlinear characteristic with an increase in the depth, a value of the coefficient depending on a shooting mode selected under which the image data is captured,
generate a depth map by associating aggregated depth data consisting of a plurality of converted depth data with the image data, each of the plurality of converted depth data being associated with one of the plurality of pixels within the image data, and
perform smoothing processing on the image data to a degree depending on the converted depth.

2. The image processing device according to claim 1, wherein the circuitry converts the depth in accordance with the function having the nonlinear characteristic to nonlinearly approach a predetermined value with the increase in the depth, and
the circuitry performs the smoothing processing based on the depth converted in accordance with the characteristic.

3. The image processing device according to claim 2, wherein the function is an exponential function defined by the following formula:
$Y=\alpha \times e^{(-\beta x)}$, where x is the depth, y is an output, e is a base of natural logarithm, $\alpha$ is a predetermined constant and $\beta$ is the coefficient.

4. The image processing device according to claim 2, wherein the function is an exponential function defined by the following formula:
$Y=\alpha \times \{1-e^{(-\beta x)}\}$, where x is the depth, y is an output, e is a base of natural logarithm, $\alpha$ is a predetermined constant and $\beta$ is the coefficient.

5. The image processing device according to claim 2, wherein the circuitry is further configured to supply the value of the coefficient depending on the shooting mode under which the image data is captured.

6. The image processing device according to claim 5, wherein the storage device is configured to store the set shooting mode in association with the image data, and
the circuitry supplies the coefficient depending on the stored set shooting condition.

7. The image processing device according to claim 1, wherein the circuitry is further configured to create an aggregation of pixels as a depth image, each pixel having the converted depth value as a pixel value.

8. The image processing device according to claim 7, wherein the circuitry is further configured to compress the depth image in accordance with a predetermined image compression format, and
the storage device is configured to store the compressed depth image in association with the image data.

9. A method of controlling an image processing device, the method comprising:
converting, with circuitry, in accordance with a predetermined function with a characteristic that varies depending on a coefficient, depth associated with at least one of a plurality of pixels within image data to have a nonlinear characteristic with an increase in the depth, a value of the coefficient depending on a shooting mode selected under which the image data is captured;
generating a depth map by associating aggregated depth data consisting of a plurality of converted depth data with the image data, each of the plurality of converted depth data being associated with one of the plurality of pixels within the image data; and
performing smoothing processing on the image data to a degree depending on the converted depth.

10. A non-transitory computer-readable storage medium including computer executable instructions, wherein the instructions, when executed by a computer, cause the computer to perform a method, the method comprising:
converting, in accordance with a predetermined function with a characteristic that varies depending on a coefficient, depth associated with at least one of a plurality of pixels within image data to have a nonlinear characteristic with an increase in the depth, a value of the coefficient depending on a shooting mode selected under which the image data is captured;
generating a depth map by associating aggregated depth data consisting of a plurality of converted depth data with the image data, each of the plurality of converted depth data being associated with one of the plurality of pixels within the image data; and
performing smoothing processing on the image data to a degree depending on the converted depth.

11. The method according to claim 9, wherein the converting converts the depth in accordance with the function having the nonlinear characteristic to nonlinearly approach a predetermined value with the increase in the depth, and
the performing performs the smoothing processing based on the depth converted in accordance with the characteristic.

12. The method according to claim 9, further comprising:
creating an aggregation of pixels as a depth image, each pixel having the converted depth value as a pixel value.

13. The method according to claim 12, further comprising:
compressing the depth image in accordance with a predetermined image compression format; and
storing the compressed depth image in association with the image data.

14. The non-transitory computer-readable storage medium according to claim 10, wherein the converting converts the depth in accordance with the function having the nonlinear characteristic to nonlinearly approach a predetermined value with the increase in the depth, and
the performing performs the smoothing processing based on the depth converted in accordance with the characteristic.

15. The non-transitory computer-readable storage medium according to claim 10, further comprising:
creating an aggregation of pixels as a depth image, each pixel having the converted depth value as a pixel value.

16. The image processing device according to claim 1, wherein the circuitry is further configured to adjust the depth so that emphasis degree of a perspective becomes low in a landscape shooting mode compared to a normal shooting mode, when a set shooting mode is the landscape shooting mode.

17. The image processing device according to claim 1, wherein the circuitry is further configured to adjust the depth so that emphasis degree of a perspective becomes low in a normal shooting mode compared to a macro shooting mode, when a set shooting mode is the normal shooting mode.

18. The image processing device according to claim 1, wherein
the circuitry is further configured to
set the shooting mode from among a plurality of shooting modes including at least one of a normal shooting mode, a landscape shooting mode, and a macro shooting mode, in response to an input, the nonlinear characteristic being different between the set shooting mode and other shooting modes of the plurality of shooting modes,
the storage device is configured to store the set shooting mode in association with the image data, and
the circuitry is further configured to supply the value of the coefficient depending on the stored set shooting mode under which the image data is captured.

19. The image processing device according to claim 1, wherein the circuitry is further configured to
set the shooting mode from among a plurality of shooting modes including at least one of a normal shooting mode, a landscape shooting mode, and a macro shooting mode, in response to an input, the nonlinear characteristic being different between the set shooting mode and other shooting modes of the plurality of shooting modes, and
supply the value of the coefficient depending on the set shooting mode under which the image data is captured.

20. The image processing device according to claim 1, wherein the associated aggregated depth data is matrix data.

21. The image processing device according to claim 20, wherein the matrix data corresponds to a matrix of the image data.

22. The image processing device according to claim 1, wherein each of the plurality of converted depth data corresponds to one of respective pixels within the image data.

* * * * *